(12) United States Patent
Gray

(10) Patent No.: US 11,744,225 B1
(45) Date of Patent: Sep. 5, 2023

(54) ANIMAL SLEEPING BAG WITH CONNECTORS FOR RELEASABLE FASTENING TO AN ANIMAL ENCLOSURE

(71) Applicant: Gene Alan Gray, Lancaster, CA (US)

(72) Inventor: Gene Alan Gray, Lancaster, CA (US)

( * ) Notice: Subject to any disclaimer, the term of this patent is extended or adjusted under 35 U.S.C. 154(b) by 0 days.

(21) Appl. No.: 17/811,552

(22) Filed: Jul. 8, 2022

(51) Int. Cl.
*A01K 1/035* (2006.01)

(52) U.S. Cl.
CPC .................................. *A01K 1/0353* (2013.01)

(58) Field of Classification Search
CPC ... A01K 1/0353; A01K 15/025; A01K 1/0272
USPC ......................................................... 119/28.5
See application file for complete search history.

(56) References Cited

U.S. PATENT DOCUMENTS

| | | | | |
|---|---|---|---|---|
| 2,032,248 | A * | 2/1936 | Bins ..................... | A01K 1/0353 119/482 |
| 3,989,008 | A * | 11/1976 | Neumann ............ | A01K 1/0353 119/482 |
| 4,893,586 | A * | 1/1990 | Carson ................. | A01K 1/0353 119/482 |
| 5,144,911 | A * | 9/1992 | Moore ................. | A01K 1/0353 119/28.5 |
| D441,146 | S * | 4/2001 | Passmore ...................... | D30/118 |
| 6,209,491 | B1 * | 4/2001 | Olson .................. | A01K 15/025 119/702 |
| 6,378,456 | B1 * | 4/2002 | Jerome ................ | A01K 1/0353 5/413 R |
| 6,378,463 | B1 * | 4/2002 | Simmons ............. | A01K 15/025 119/707 |
| 7,765,952 | B1 * | 8/2010 | Archibald ........... | A01K 1/0353 119/28.5 |
| D725,832 | S * | 3/2015 | Coulter ........................ | D30/118 |
| 11,278,001 | B2 * | 3/2022 | Autenrieth .......... | A01K 1/0353 |
| 11,432,527 | B1 * | 9/2022 | Pan ...................... | B60N 2/6027 |
| 2016/0021846 | A1 * | 1/2016 | Bigott .................. | A47G 9/0223 119/28.5 |

* cited by examiner

Primary Examiner — Yvonne R Abbott-Lewis

(57) ABSTRACT

A said Device comprises an animal sleeping bag with sewn, integral, or otherwise attached connectors. At least one connector, from a variety of connectors, releasably fastens the Device substantially within the interior and to the entrance of an animal enclosure, such as a dog house, a sectional dog house, animal crate, or other suitable animal housing structure. The preferred Device comprises at least two layer members, or the Device can comprise a single-layer member or cover. At least one layer member of the Device is shaped so that it swathes an animal inhabitant. The releasable fastening of the Device to an animal enclosure causes the Device to remain in a substantially stable configuration, ensures that an animal inhabitant can have at-will accessibility to a lodging compartment, and makes the Device removable for cleaning or replacement. A connector can comprise off-the-shelf hardware or can be manufactured from available products.

20 Claims, 17 Drawing Sheets

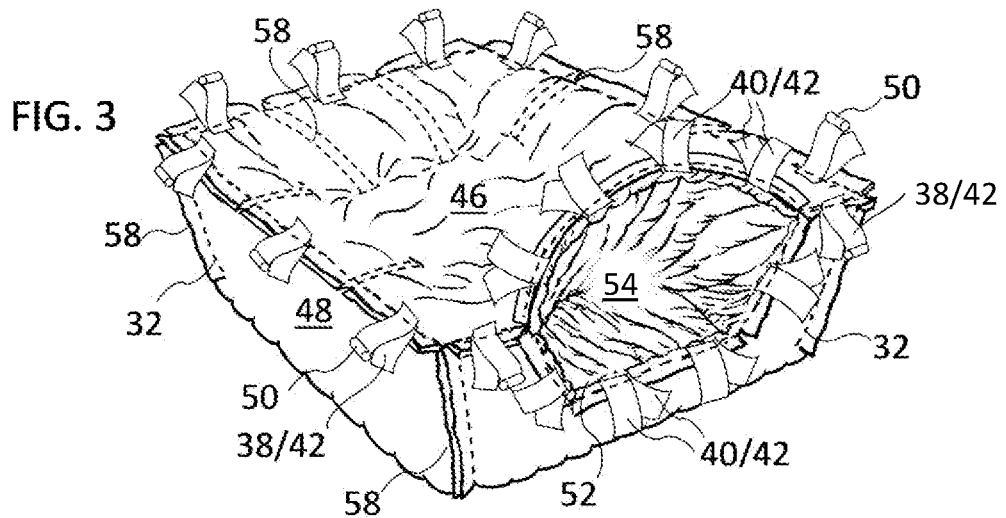
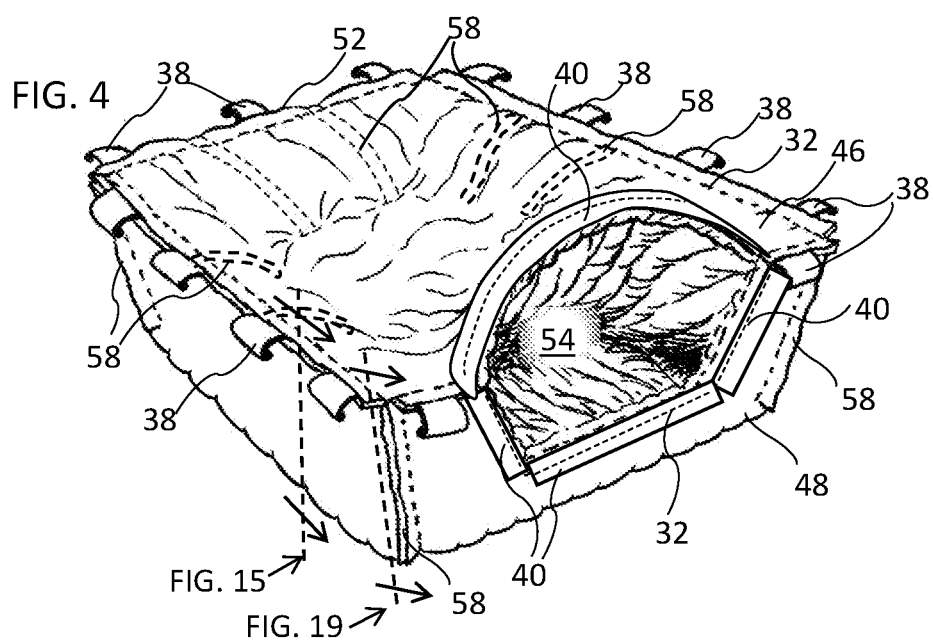
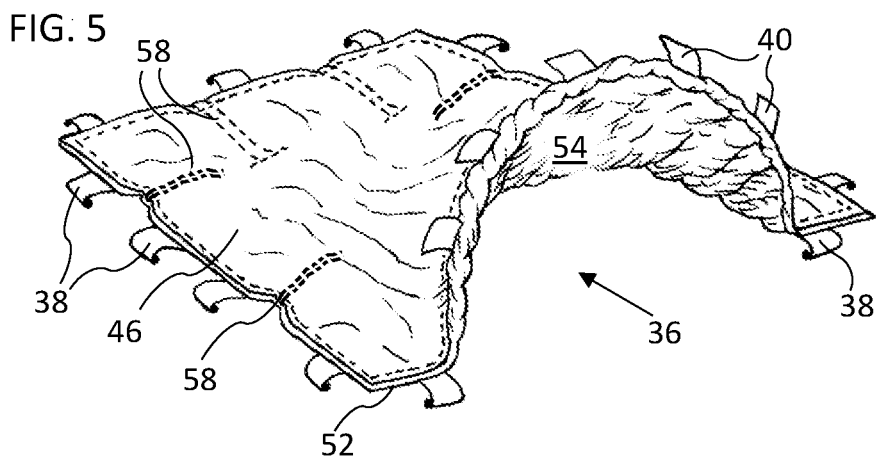

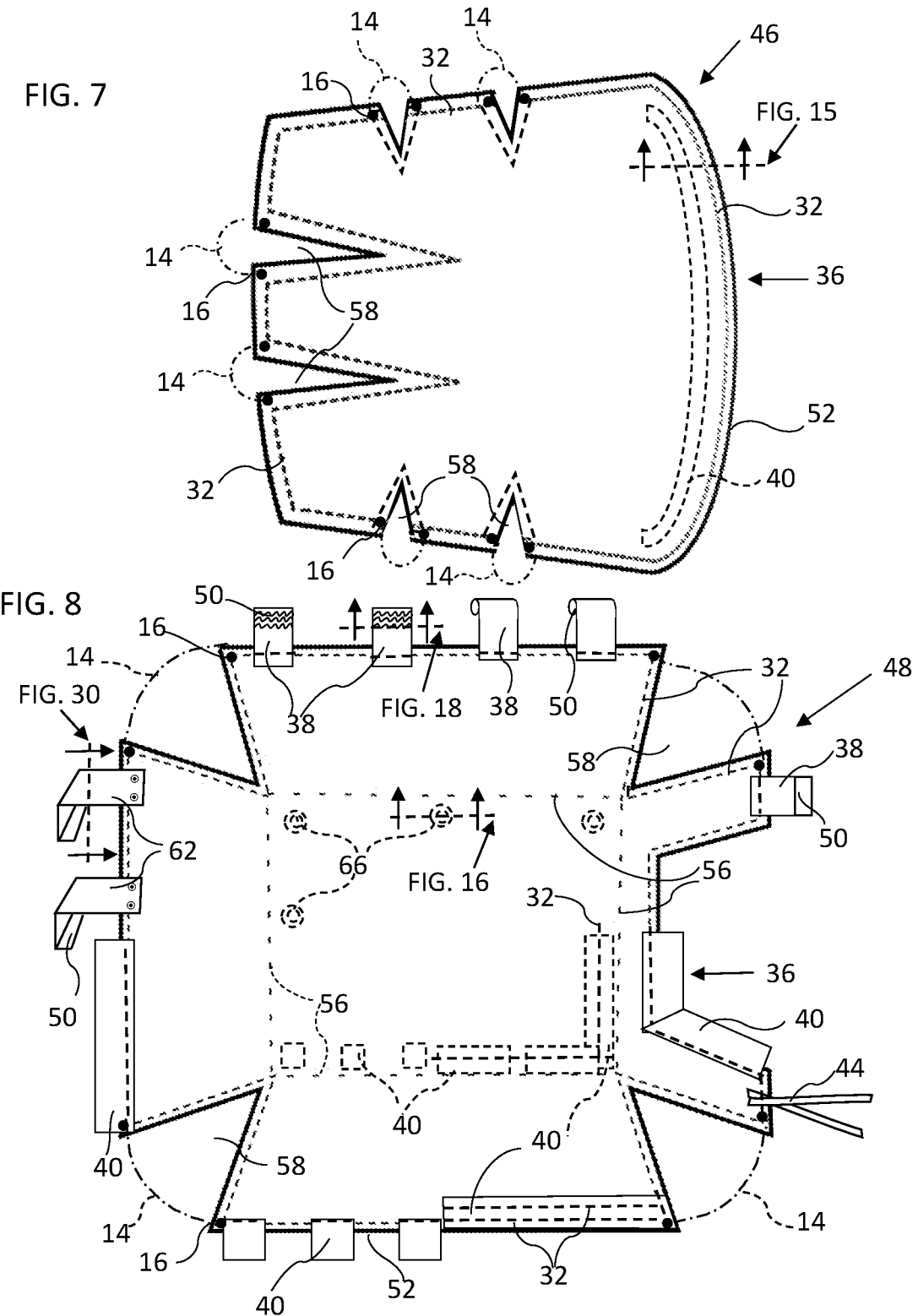

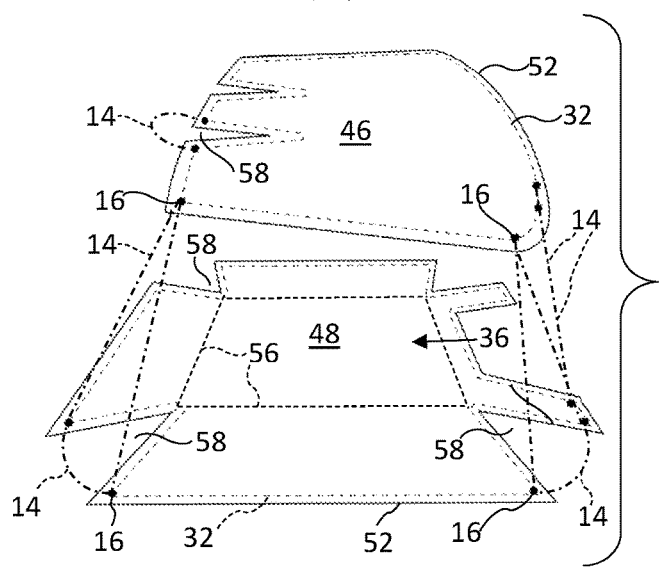
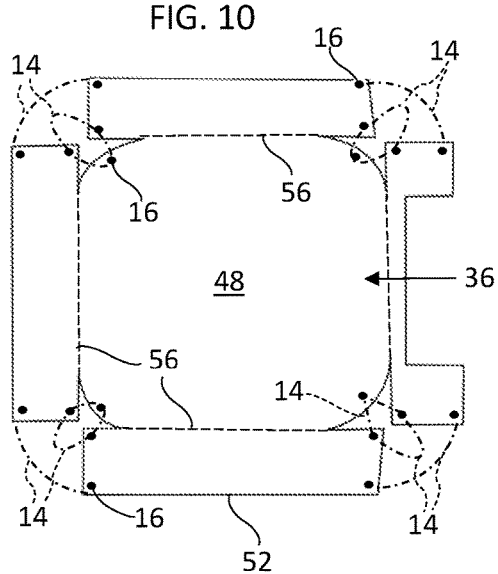
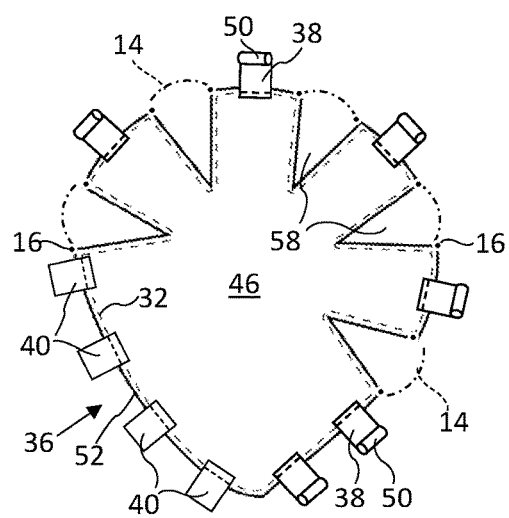
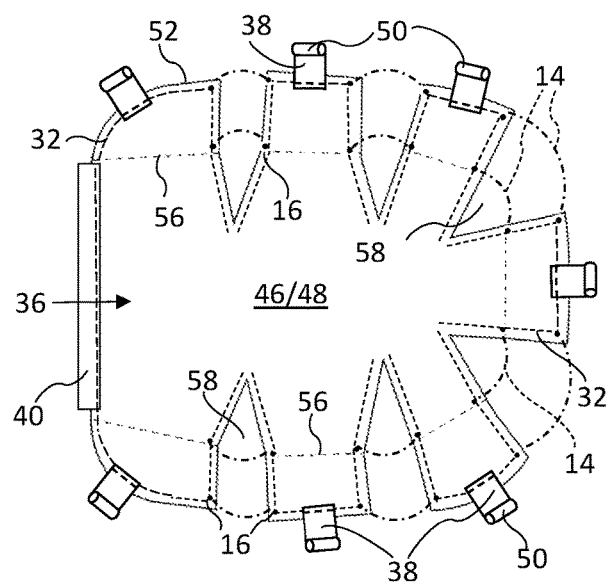

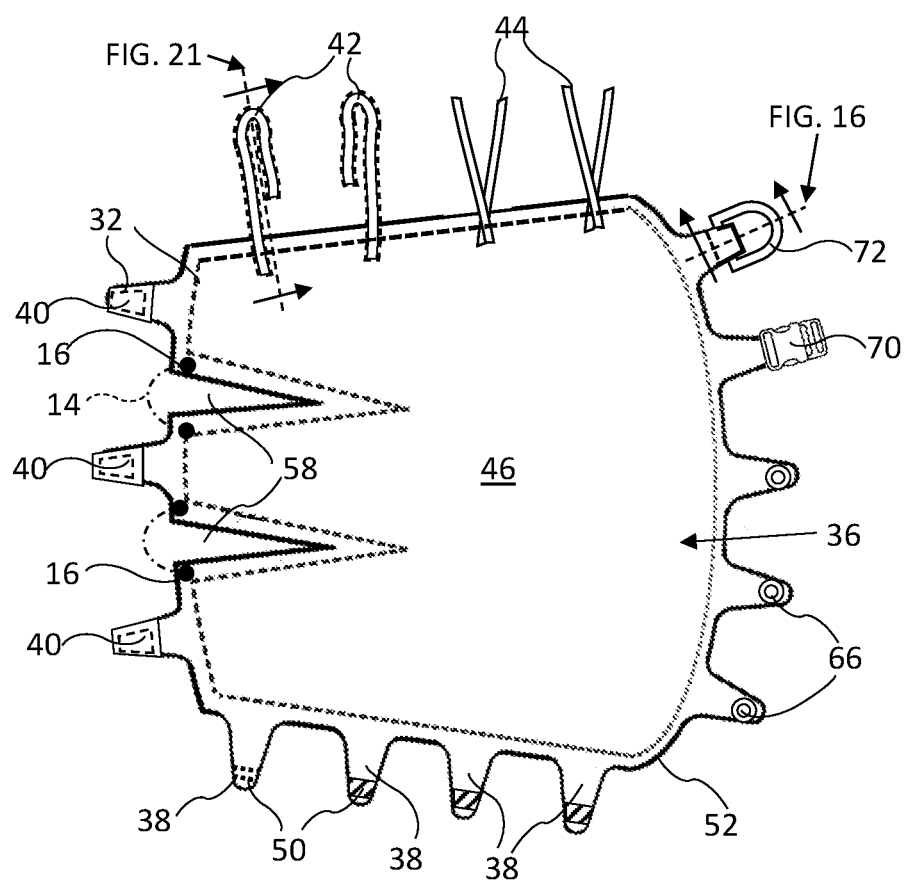

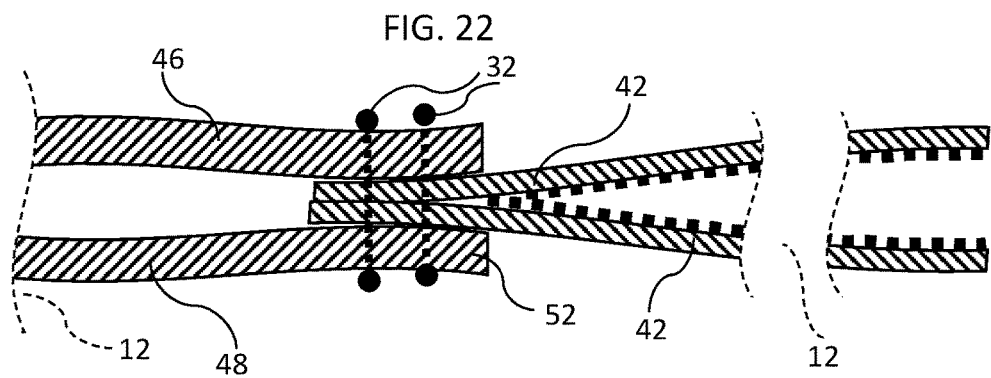
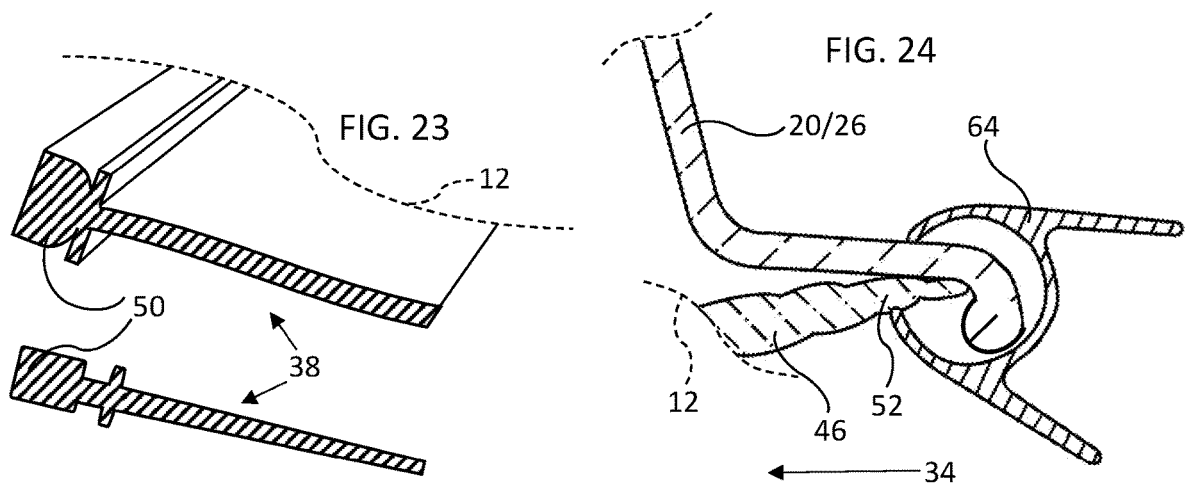
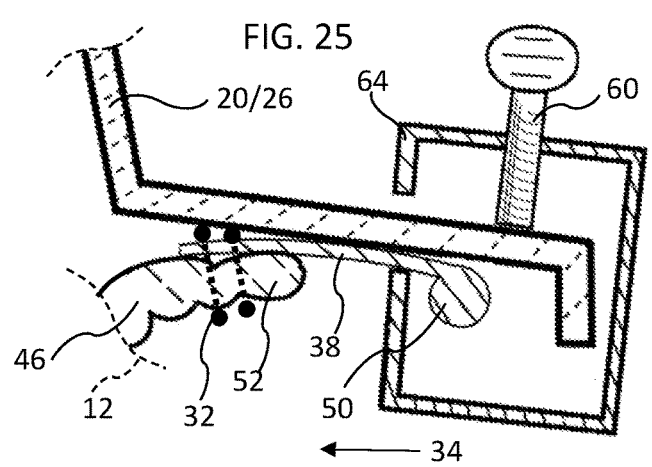
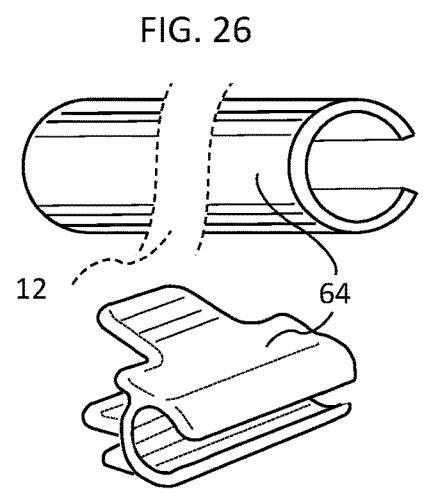

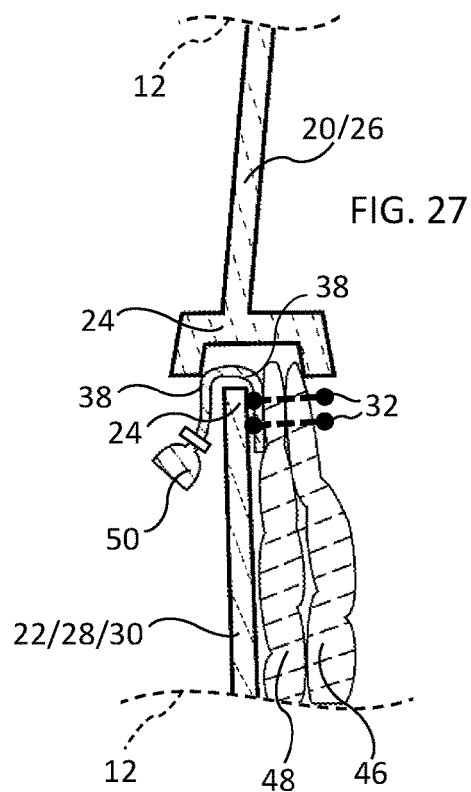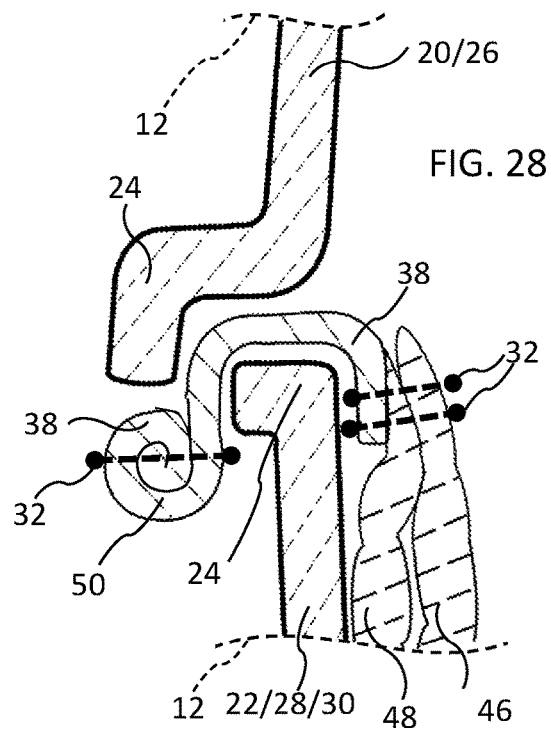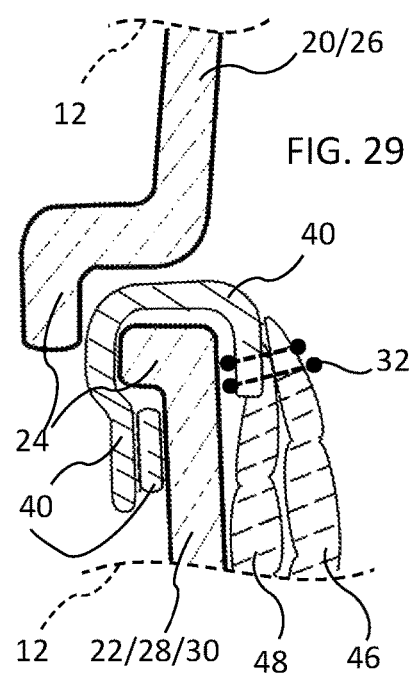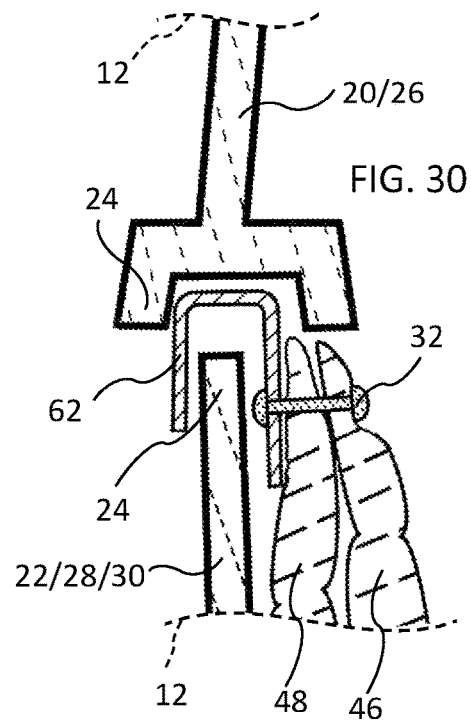

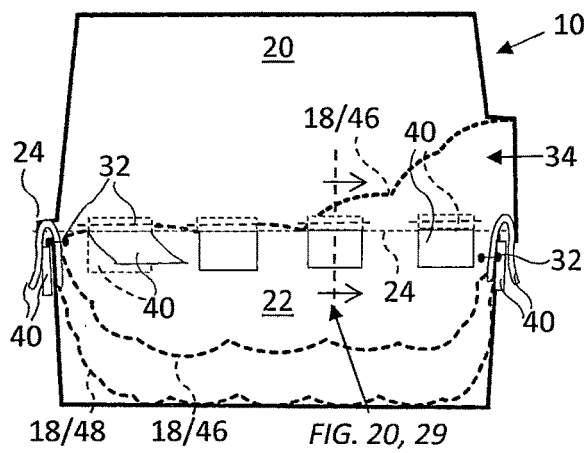
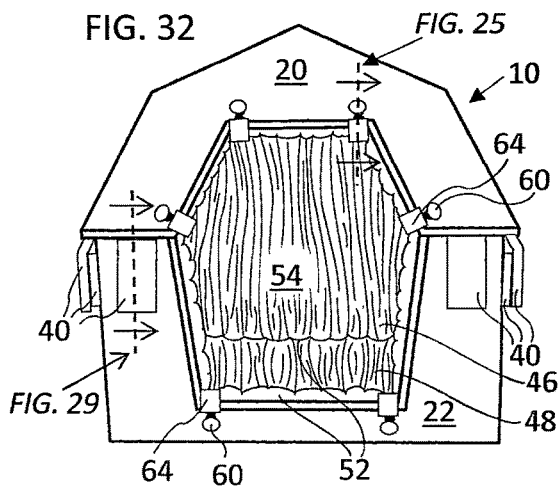
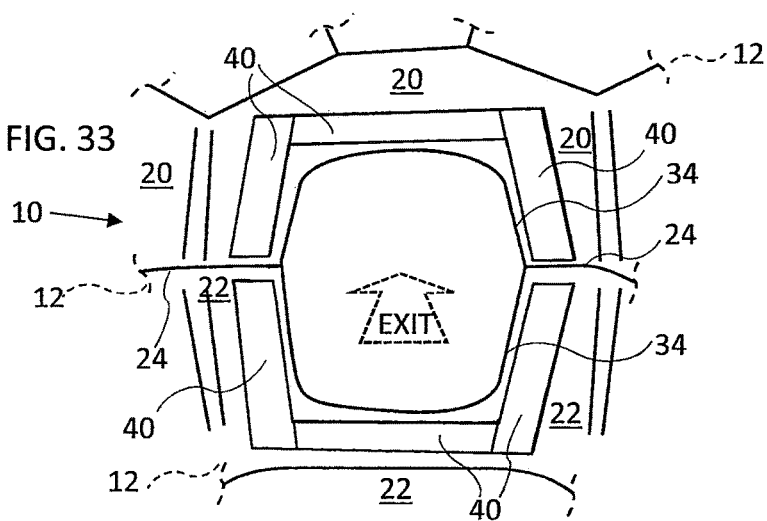
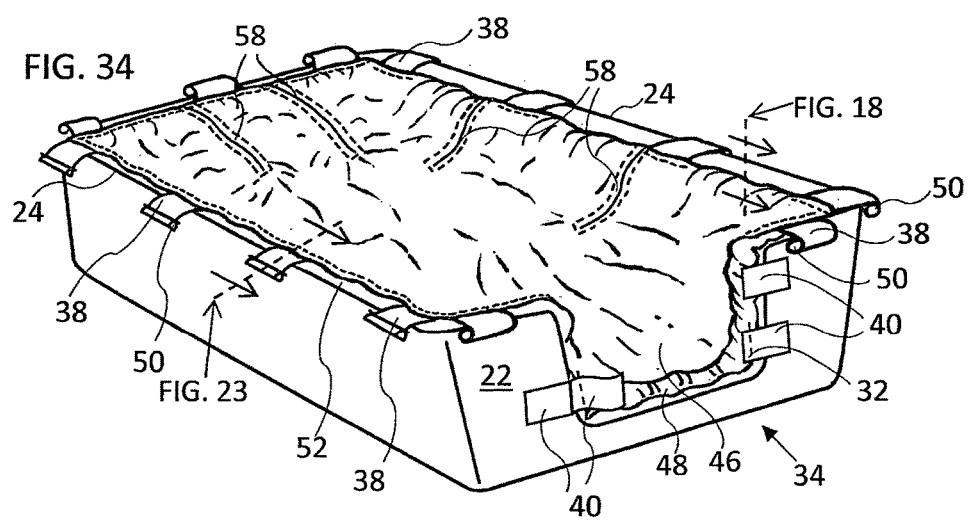

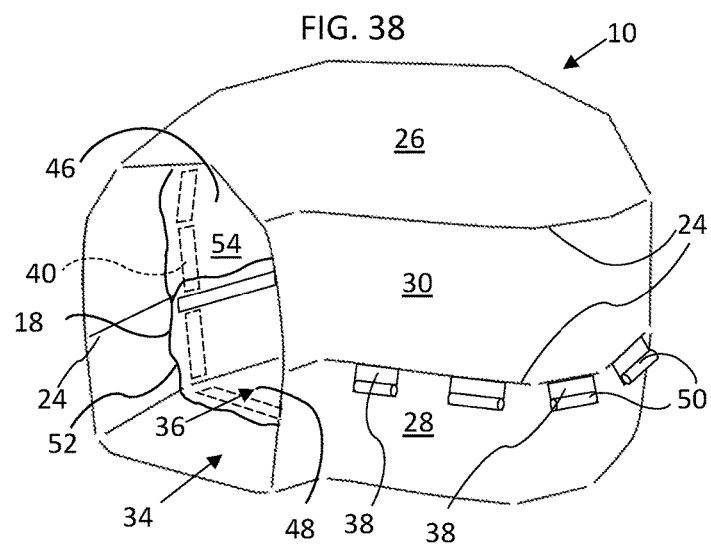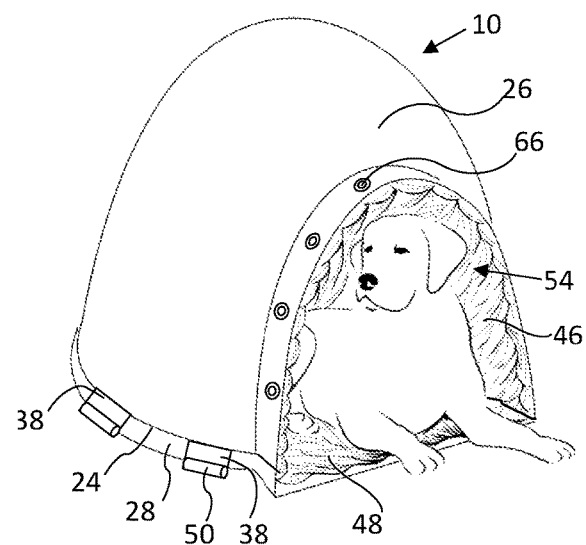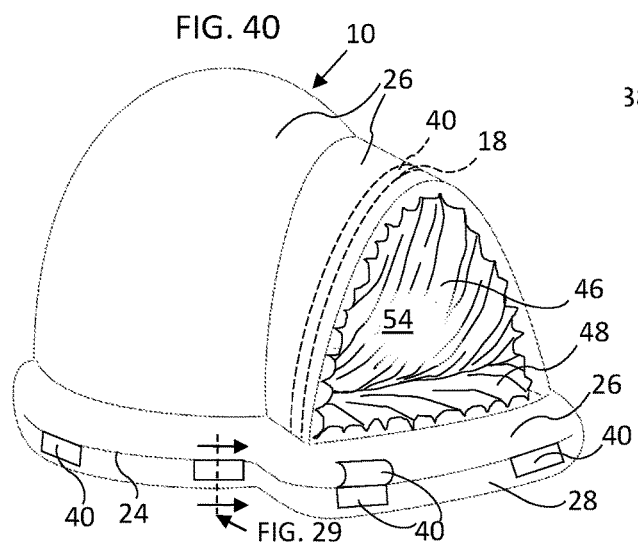

US 11,744,225 B1

ANIMAL SLEEPING BAG WITH CONNECTORS FOR RELEASABLE FASTENING TO AN ANIMAL ENCLOSURE

BACKGROUND OF THE INVENTION

FIELD OF THE INVENTION

Technical Field: U.S. Patent Classification: 5/413.

International Patent Classifications: A01K 1/033; A01K 1/035; A01K 1/0353.

This disclosure relates generally to pet beds and animal sleeping bags which provide a cover for an animal, and which are intended for use in a dog house, or animal crate. Some proposals for covered pet beds include the use of bolsters, thick padding, or a support structure to retain the bed's shape or to ensure that the animal has access to the bed's entrance. Bolsters which hold open a sleeping compartment can create drafty air pockets. Bolsters may not be cleanable. Support structures may need to be removable for cleaning a pet bed, which adds to its complexity of use. Bolsters and support structures in a pet bed add to costs of manufacturing and marketing.

Some animal sleeping bags become disarrayed after use and require regular attention by an animal's owner to ensure that the animal has access to the sleeping bag's interior. Some proposals for animal sleeping bags require the use of a thick padding, a stiffening assembly or frame to provide the animal accessibility to the interior. Exterior-use animal sleeping bags may have to be staked to the ground to provide stability. Many animal sleeping bag designs are purposed for indoor use. Similar accessibility and stability circumstances occur when an animal sleeping bag or pet bed is used in a dog house or animal crate. Dog houses and animal crates which lack insulating properties provide limited protection from inclement weather. Accordingly, there is potential for an improved pet bed and animal sleeping bag.

BRIEF SUMMARY OF THE INVENTION

The exemplary embodiments and aspects described herein relate generally to the releasable fastening of an animal sleeping bag to a sectional dog house, other dog house, or animal crate. A sectional dog house, animal crate, or other dog house may hereinafter be referred to collectively as "animal enclosure." Without limiting the scope of "Device: Animal Sleeping Bag with Connectors for Releasable Fastening to an Animal Enclosure," it is hereinafter referred to as "Device." A said Device can comprise a sleeping-bag-like assembly, or a single-layer covering further comprising at least one of a variety of connectors which can releasably fasten said Device substantially within the interior and entrance of an animal enclosure, whereby said Device can remain in a substantially stable configuration, whereby an animal inhabitant can have at-will accessibility to said Device's lodging compartment, and whereby at least one layer member of a said Device can comprise a form which can substantially swathe, or drape, an animal inhabitant.

BRIEF DESCRIPTION OF THE SEVERAL VIEWS OF THE DRAWINGS

FIG. 3 depicts a left-front perspective of an embodiment of a said Device comprising two embodiments of combination connectors.

FIG. 4 depicts a left-front perspective of an embodiment of a Device.

FIG. 5 depicts a left-front perspective of a one-layer member embodiment of a Device.

FIG. 7 depicts a top view of an embodiment of an unassembled upper layer member 46.

FIG. 8 depicts a top view of an embodiment of an unassembled lower layer member 48.

FIG. 9 depicts an exploded perspective side view of an assembly diagram for an embodiment of a Device.

FIG. 10 depicts a top view of an embodiment of an unassembled lower layer member 46.

FIG. 11 depicts a top view of an embodiment of an unassembled upper layer member 46.

FIG. 12 depicts a top view of an embodiment of either an unassembled top 46 or bottom 48 layer member.

FIG. 13 depicts a top view of an embodiment of a top layer member 46 comprising a variety of connectors.

FIG. 22 depicts a side cross-section partial view of layer members 46 and 48 comprising an embodiment of a third connector 42.

FIG. 23 depicts cross-section end views of embodiments of two first connectors 38.

FIG. 24 depicts a side cross-section partial view of a said Device's edge area 52 secured by an embodiment of a sixth connector 64 to a dog house's 10 entrance's 34 edge area.

FIG. 25 depicts a side cross-section partial view of a said Device's upper layer member 46 and an embodiment of a sixth connector 64.

FIG. 26 depicts two embodiments of sixth connectors 64.

FIG. 27 depicts a side cross-section partial view of a first connector 38 interposed between a dog house's 10 engaging edges 24.

FIG. 28 depicts a side cross-section partial view of a first connector 38 interposed between a dog house's 10 engaging edges 24.

FIG. 29 depicts a cross-section partial side view of a second connector 40 between a dog house's 10 engaging edges 24.

FIG. 30 depicts a cross-section partial side view of a fifth connector 62 interposed between a dog house's 10 engaging edges 24.

FIG. 31 depicts a side cross-section view of a dog house 10 comprising second connectors 40.

FIG. 32 depicts a front-elevation of a dog house 10 with a said Device and second connector 40 and sixth connector 64.

FIG. 33 depicts an interior-to-exterior partial view through an entrance 34 of a sectional dog house 10.

FIG. 34 depicts a left-front perspective view of a said Device substantially within a dog house's 10 lower section 22.

FIG. 38 depicts a right-front perspective view of a three-section igloo-style sectional dog house 10, comprising an embodiment of a Device.

FIGS. 39 and 40 depict left-front perspective views of two sectional igloo-style dog houses 10 and embodiments of a Device.

FIG. 43 depicts an embodiment of a Device depicted by an outline 18.

DETAILED DESCRIPTION OF THE INVENTION

Figure 1:
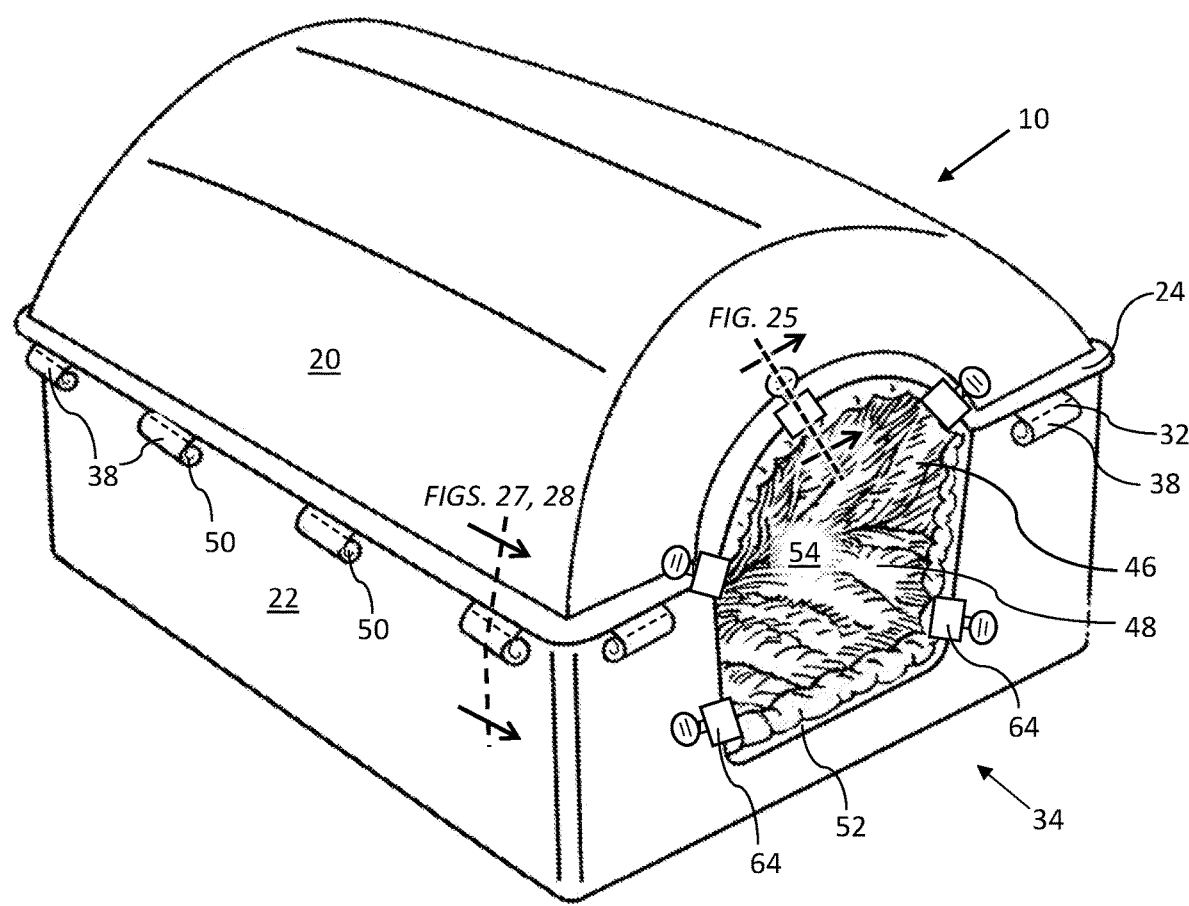
FIG. 1 depicts an exemplary embodiment of a left-front perspective of a said Device disposed substantially within the interior of a sectional dog house 10. The dashed lines refer to a cross-section depicted in FIGS. 25 and 49, and in FIGS. 27 and 28.

The disclosures and terminology in this document are presented to enable a person having ordinary skill in the art to make and use the Device. Various modifications and embodiments are disclosed, and others can be readily apparent, but are merely illustrative of the application of the principles of a said Device, without departing from its scope. Each modification can be beneficial, and can be used in conjunction with other modifications and embodiments. References herein to details of the depicted embodiments of the Device are not intended to limit the scope of the claims, which themselves recite those features regarded as essential to this disclosure.

The term "depict" means to portray and represent, but not to specifically describe. The objects and parts thereof in the drawings are not drawn to scale. Some drawings may include two or more reference characters on one lead line, which can indicate that at least one of the referenced elements can be present. A single, or a pair of, curved dashed lines 12 in a depiction can indicate a variable measurement 12 (such as in FIGS. 14, 15, 16, 17, 18, 19, 20, 21, and 22); or a fractional view 12 (such as in FIGS. 14, 15, 16, 17, 18, 19, 20, 21, 22, 23, 24, 25, 26, 27, 28, 29, 30, 33, 47 and 49). In some Figures, dash-dot lines 14 and dot alignment points 16 depict how components can be aligned and connected, such as in FIGS. 2, 6, 7, 8, 9, 10, 11, 12, 13 and 48. The dashed line 56 can indicate a suggested fold area in a layer member, depicted in FIGS. 8, 9, 10, 12, and 48.

The Device comprises an animal sleeping bag, said animal sleeping bag further comprises at least one of a variety of connectors which releasably fasten said animal sleeping bag to an animal enclosure 10/74. The Device can be portrayed as an animal sleeping bag which is releasably fastenable substantially to an entrance 34 of, and substantially within, an interior of, a sectional dog house 10 or animal crate 74, whereby said Device can remain in a substantially stable configuration; whereby an animal inhabitant can have at-will accessibility to said lodging compartment 54; whereby at least one layer member of said Device can comprise a form which can substantially swathe, or drape, an animal inhabitant; and whereby said Device can be removed from an animal enclosure [10/74].

Embodiments of the Device can be configured to cooperate with a variety of animal enclosures [10/74]. The term "suitable" when used in conjunction with said terms, such as animal enclosure [10/74], dog house 10, and animal crate 74, can refer to an animal housing apparatus to which an embodiment of a said Device can be releasably fastened, or which can be adapted in order for a said Device to be releasably fastened to it, or said Device can be adapted to fit a said animal enclosure [10/74].

Figure 41:
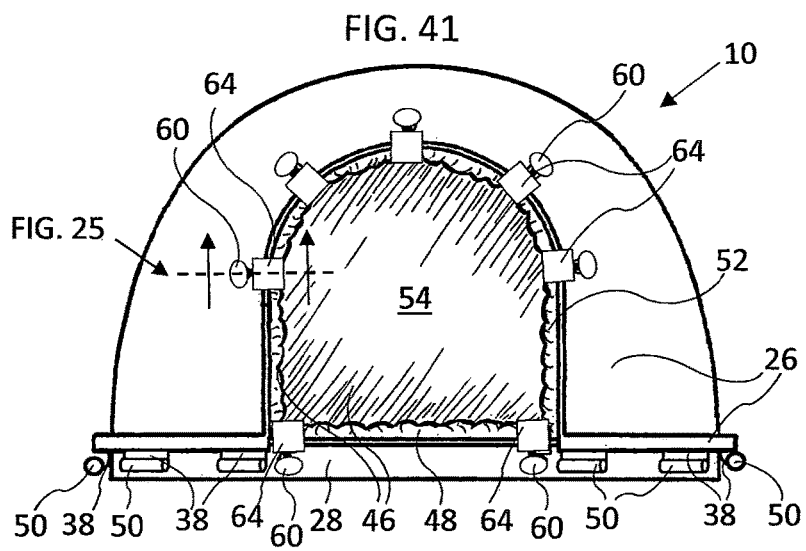
FIG. 41 depicts a front view of an igloo-style sectional dog house 10 and an embodiment of a Device.
Figure 42:
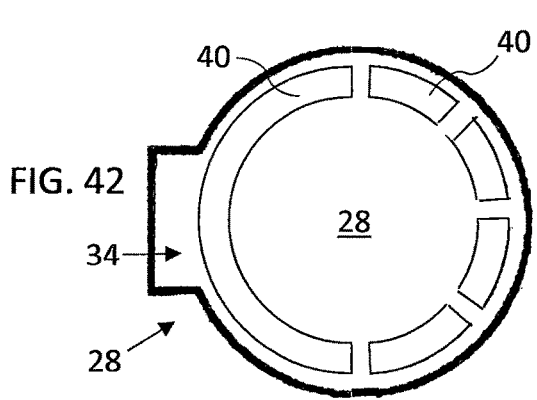
FIGS. 42, 43, 44, and 45 depict top views of lower sections 28 of igloo-style sectional dog house 10.
Figure 44:
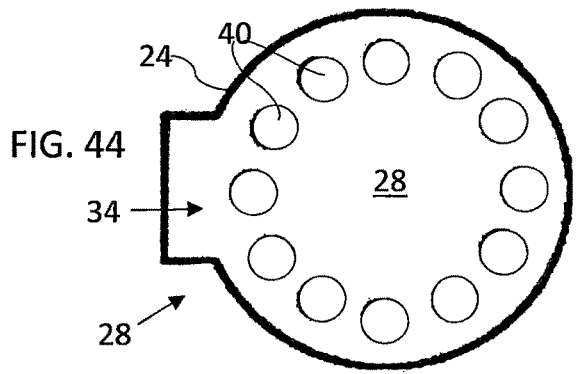

A preferred dog house 10 which can cooperate with a said Device can comprise a dog house 10 of a plastic-type or structural-foam construction, some of which can be referred to as a sectional dog house 10 or barn-style sectional dog house 10, comprising an upper section 20 and a lower section 22, and engaging edges 24 (depicted in FIGS. 1, 2, 31, 32, 33, and 37). Another type of a said dog house 10 can include an igloo-style sectional dog house 10, comprising an upper section 26 and a lower section 28 (depicted in FIGS. 39, 40, and 41). FIG. 38 depicts an igloo-style sectional dog house 10 comprising three said sections (top section 26, bottom section 28, and intermediate section 30). Manufacturers of said sectional dog houses 10 include a type of locking tab, or other securing element, with which to connect said engaging edges 24. FIGS. 27, 28, 29, and 30 depict said engaging edges 24. Further, there are other suitable dog houses 10, such as panel-type dog houses 10 with which embodiments of a said Device can be designed to cooperate.

CONNECTORS: Exemplary embodiments of a said Device comprise at least one of a variety of said connectors which releasably fasten said animal sleeping bag substantially within the interior and substantially to the entrance 34 of an animal enclosure [10/74], such as a dog house 10 or an animal crate 74. A Device can further comprise a variety of connectors which can releasably fasten a said Device's lodging compartment's 54 opening 36 substantially to said entrance 34.

Variations of said connectors not explicitly described in this Specification can be designed to perform the intended function of a releasable fastening connector. Connectors and components not mentioned in this document do not invalidate the principles of the Device, which are: working in conjunction with; being supported by; being releasably fastened substantially within the interior of; being releasably fastened substantially to an entrance 34 of an animal enclosure [10/74], such as a said dog house 10 or animal crate 74.

Any said connector will not prevent the substantial joining of a said dog house's 10 said engaging edges 24 (depicted in FIGS. 27, 28, 29, and 30). Most engaging edges 24 in a sectional dog house 10 comprise sufficient tolerances which can allow the interposition of suitable said connectors. The dimensions of any said connector can be determined by the availability of a material which comprises a said connector. Any said connector can comprise at least one material. A preferred said connector can comprise a material which may be non-absorbent in order to inhibit moisture from wicking into the Device. A preferred connector can be commercially available, or can be produced using commercially available materials.

At least one of a variety of said connectors: is attached to the said animal sleeping bag of the Device, is integral to said animal sleeping bag of said Device, or a combination of thereof. A said connector can be substantially attached to any suitable portion of a said Device. At least one said connector can be an appendage to: an animal enclosure [10/74], a dog house 10, an animal crate 74, or a combination thereof. At least one of a variety of said connectors, or a portion thereof, can be attached to a said animal enclosure [10/74]. Any said connector can be attached to a said Device by sewing 32, bonding 32, by a mechanical fastener, or in a suitable manner.

A said connector can comprise at least one releasably fastenable characteristic. "Releasably fasten" can refer to a said connector by which a user can both connect and disconnect a said Device from an animal enclosure [10/74]. A said connector can comprise at least one of: a fixed dimension, a variable dimension, an elastic characteristic, or a combination thereof. Connectors depicted can further comprise variations. At least one connector can be attached to at least one other connector.

A preferred animal enclosure [10/74], dog house 10, or animal crate 74 can be a commercial or hand-built animal enclosure [10/74] which can be compatible with the attachment of said connectors. A said animal enclosure's [10/74] manufacturer, or an end-user, may install suitable connectors. If a said dog house 10, or an animal crate 74 manufacturer offers an entrance 34 curtain or other accessory, a said connector can be attached in a non-interfering location with respect to said accessory's location.

Embodiments of said connectors can comprise at least one of: a first connector 38, a second connector 40, a third connector 42, a fourth connector 44, a fifth connector 62, a sixth connector 64, a seventh connector 66, other various types of connector hardware, or a combination thereof.

A first connector 38 comprises at least one of: a portion of conformable material, or planate material, or a combination thereof, wherein at least a portion of a said first connector 38 can be interposed between, and substantially allow the joining of, a sectional dog house's 10 sections' engaging edges 24. At least one of a variety of said connectors can at least partially be interposed between a sectional dog house's 10 sections' engaging edges 24. A dog house's 10 said engaging edges 24 grip at least a portion of said first connector 38 (which is connected to a said Device), thereby securing a said Device substantially within the interior said dog house 10.

At least one of a variety of said connectors can further comprise at least one slip-inhibitive element 50, wherein at least a portion of a said slip-inhibitive element 50 is substantially between a said sectional dog house's 10 sections' engaging edges 24. An embodiment of a first connector 38 further comprises at least one slip-inhibitive element 50, (depicted in FIGS. 1, 2, 3, 4, 5, 8, 11, 12, 13, 15, 17, 18, 19, 23, 25, 27, 28, 34, 38, 39, 41, and 43). A cross-section of an embodiment of a said first connector 38 is depicted in FIGS. 15, 17, 18, 19, 23, 25, 27 and 28. FIG. 28 depicts a cross-section partial view (from FIG. 1) of an embodiment of a said first connector 38.

A said slip-inhibitive element 50 can deter at least a portion of said first connector 38 from becoming disengaged from between, and can cause at least a portion of a said first connector 38 to remain interposed between, a said sectional dog house's 10 engaging edges 24. A first connector's 38 said slip-inhibitive element 50 can be positioned substantially between said engaging edges 24.

A slip-inhibitive element 50 can comprise a form, texture, surface irregularity, detent, adhesive, prominence, or a combination thereof. A said first connector's 38 said slip-inhibitive element 50 can be rolled or folded into said first connector 38 (said roll or fold which can be sewn 32 through, stapled, or suitably bonded, depicted in FIGS. 15, 17, 19 and 28), attached, extruded or molded (depicted in FIG. 18, comprising a concavity or a protrusion). A said first connector 38 can be fashioned from existing products which can comprise a slip-inhibitive element 50, such as generic vinyl or rubber garage door weather seal blades (depicted in FIGS. 18, 23, 25, 27, and 34).

Figure 17:
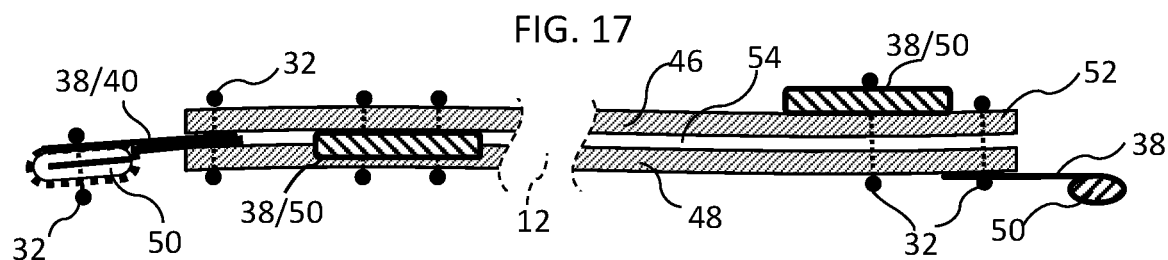
FIG. 17 depicts a rear section view of an embodiment of layer members 46 and 48.

FIG. 17 depicts first connectors 38 (from FIG. 2) substantially attached to said layer members 46 and 48, and a combination first 38/second 40 connector on the left side of the depiction. A said second connector 40 can serve as a said first connector 38 if a said second connector 40 comprises a slip-inhibitive element 50 (depicted in FIG. 17).

FIG. 38 depicts an igloo-style sectional dog house 10 comprising three said sections (top 26, bottom 28, and intermediate 30), and an embodiment of the Device (depicted by lines 18) comprising two layer members 46 and 48, attached, in part, with said first connectors 38 interposed between said engaging edges 24 of said sections 28 and 30.

At least one of a variety of said connectors can comprise a separable fastener material[.] A second connector 40 comprises mating portions of separable fastener material, wherein one said portion can be attached to a layer member of the animal sleeping bag, and a mating portion can be correspondingly disposed and securely attached to a dog house 10 or an animal crate 74, thereby releasably fastening at least one layer member of the animal sleeping bag to the dog house 10 or an animal crate 74. FIGS. 33, 35, 36, 37, 38, 42, 43, and 44, depict examples of interior positionings of said second connectors' 40 mating portions. FIGS. 29, 31, 32, 34, and 40, depict examples of exterior positionings of said mating portions 40.

A second connector's 40 separable fastener material can include types of hook-and-loop material; other types of pressure-engaging material; sewn-on separable fastener material; and adhesive-fastening or otherwise bonding separable fastener material. FIG. 29 depicts a detail of said second connector 40, from FIGS. 31 and 40.

A second connector 40: can fully comprise a said separable fastener material; can further comprise at least another material (such as a woven strap- or tape-like material; or a combination thereof.

A preferred attachment process of a second connector 40 to a dog house 10 or animal crate 74 can be an uncomplicated process that an average person can perform, and can include adhesive attachment or a mechanical attachment. In addition, a manufacturer of a dog house 10 or animal crate 74 may provide mechanical, thermal, or ultrasonic bonding.

At least a portion of a said second connector 40 can be attached to any layer member (depicted in FIGS. 2, 4, 5, 6,

8, 11, 12, 13, 15, 17, 20, 29, 31, 32, 33, 34, 35, 36, 37, 38, 40, 42, 43, and 44). FIGS. 31, 35, 37 and 40, depict, with dashed outlines 18, said second connectors 40, indicating that said second connectors 40 can be located on an inside surface of a dog house 10 or animal crate 74.

FIG. 38 depicts layer members 46 and 48 of an animal sleeping bag in an igloo-style sectional dog house 10, with a said Device's said opening's 36 edge area 52 of said lodging compartment 54 releasably fastened to mating portions of second connectors 40, indicated by dashed lines 18.

A combination connector can comprise the features of at least two said connectors. At least one of a variety of said connectors can also comprise at least one feature of at least one other said connector. FIG. 3 depicts an animal sleeping bag's layer members 46/48 comprising two embodiments of combination connectors. Said layer members' 46/48 edge areas 52 comprise connectors 38/42; one combination connector comprises a slip-inhibitive element 50 of a first connector 38 along with a self-engaging separable fastener material used in a third connector 42. The sleeping bag's opening's 36 edge area 52 comprises combination connectors 40/42 which comprise a separable fastener material used in second connectors 40 and a self-engaging separable fastener material used in third connectors 42. Any said connector can be collocated substantially with any other said connector.

At least one of a variety of said connectors can comprise a self-engaging separable fastener material. A third connector 42 can comprise a releasably fastening separable fastener material (such as a hook-and-loop-type, which can also comprise a self-engaging separable fastener material) which is securely attached to the Device, and which can releasably engage a dog house's 10 or animal crate's 74 structure without being securely attached to said structure (unlike a second connector 40). A third connector 42 can comprise a single portion or multiple portions of a separable fastener material (depicted in FIGS. 13, 14, 21, 22, 46, and 47). A third connector 42 can further comprise an attached portion of a banding or strap-like material, depicted in FIG. 46. A said third connector 42 can function as a first connector 38 if at least a portion of said third connector 42 comprises a slip-inhibitive element 50 (an example of a combination connector).

Figure 46:
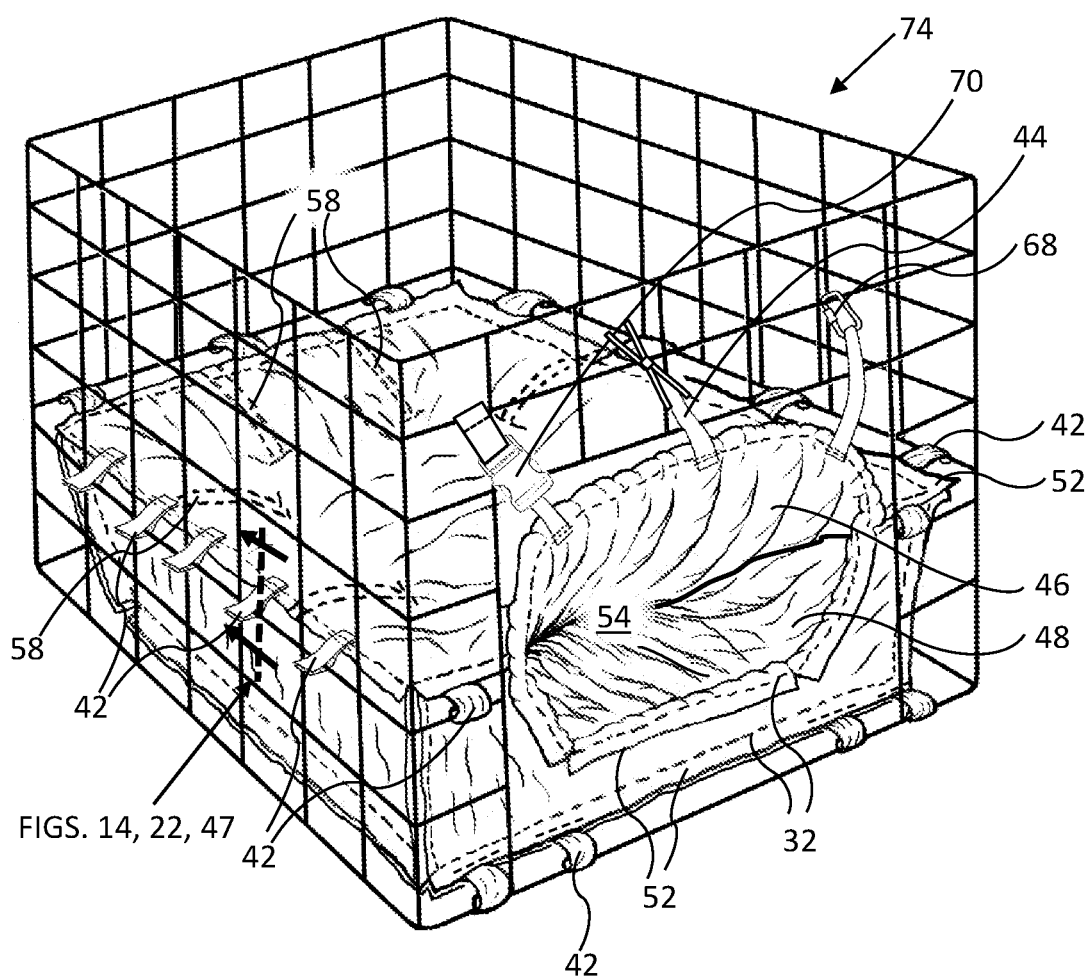
FIG. 46 depicts a left-front perspective view of a generic animal crate 74, and a Device comprising [[five]] [six] sewn 32 panels.
Figure 47:
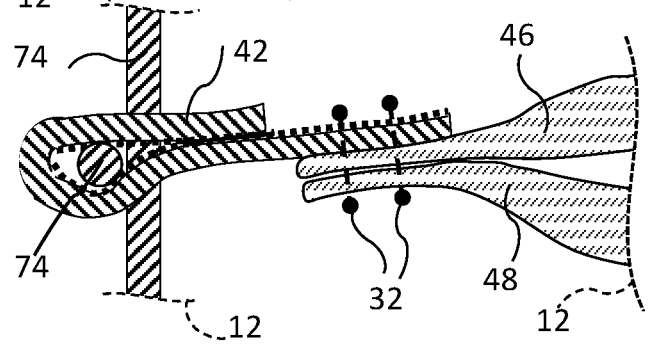
FIG. 47 depicts a side cross-section partial view of a third connector 42.

A fourth connector 44 can further comprise a cord, cable wrap, twist tie, cable tie, a strap-like material, lace, or a loop for a cable tie (depicted in FIGS. 8, 13, and 46). A fourth connector 44 can be entwined or knotted about a suitable dog house's 10 or animal crate's 74 structure (depicted in FIG. 46).

At least one of a variety of said connectors can comprise at least one releasable fastening mechanical apparatus. A fifth connector 62 can comprise a type of hook (depicted in FIGS. 8 and 30). FIG. 30 depicts a cross-section (from FIG. 8) of a type of hook 62 (similar to a flat hook or gutter hook, webbing hook, wire hook, perhaps comprising a slot for webbing or a strap) which can be shaped to complement said engaging edges 24; a slip-inhibitive 50 utility of which is the hook's 62 resistance to changing shape. Said hook 62 can comprise a material with a shape-retaining property, and can be attached to at least one said layer member with a rivet 32, a sewn-on 32 strap, or by a suitable mechanical attachment 32. A dog house 10 or animal crate 74 may comprise an appropriate engaging slot for receiving a variation of a said hook 62.

A sixth connector 64 comprises a type of clamp (depicted in FIGS. 1, 24, 25, 26, 32, 41 and 49) which can releasably and securely grip any suitable portion of a Device to a said dog house 10 or animal crate 74 an animal enclosure 10/74. A preferred clamp 64 can be operated without the aid of a tool. A preferred clamp 64 can releasably fasten a said Device's opening's 36 edge area 52 to a said dog house's 10 or animal crate's 74 entrance's 34 edge area (depicted in FIGS. 24, 25 and 49). A preferred clamp 64 can releasably fasten at least one of: a layer member; another connector; or a combination thereof; to a dog house 10 or animal crate 74.

Figure 49:
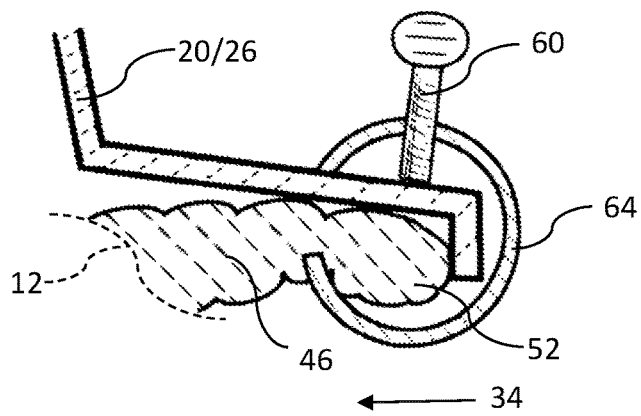
FIG. 49 depicts a side cross-section partial view of a said Device's upper layer member 46 and a sixth connector 64 clamp.

For example, FIGS. 25 and 49 depict C-channel-type sixth connector 64 clamps, comprising a thumb screw 60, said clamp compressing and securing a said first connector 38 against a said dog house's 10 entrance's 34 edge area. FIGS. 24 and 26 depict types of sixth connector 64 clamps which are generic tarp clips or clamps. FIG. 26 depicts two types of tarp clamps 64; said tarp clamps 64 can comprise a flexible slotted tube, depicted on top; and a flexible slotted tube with grasping opening tabs, depicted on the bottom. A said tarp clamp 64 can be of a variable length 12.

A seventh connector 66 comprises male and female snap halves (depicted in FIGS. 8, 13, 16, 36, 39, and 45) to complete a snap assembly. One snap-half can be screwed or otherwise securely attached to said dog house 10 whereas a mating snap-half can be securely and correspondingly attached to a layer member.

Figure 16:
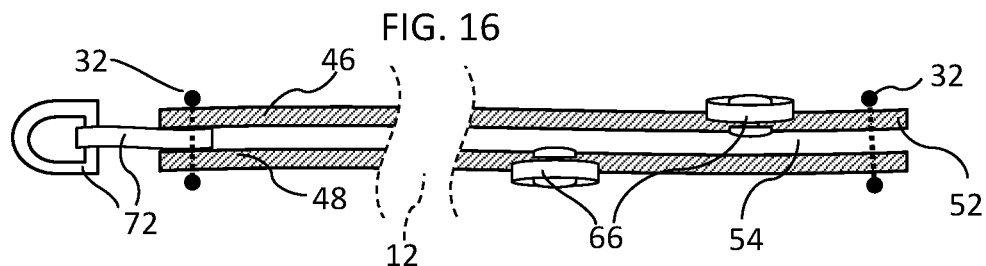
FIG. 16 depicts a front section view of an embodiment of layer members 46 and 48.

Additional connectors can include a carabiner 68 (depicted in FIG. 46); squeeze or slide buckle 70 (depicted in FIGS. 13 and 46); and ring or D-ring 72 (depicted in FIGS. 13 and 16). A connector can further comprise, but is not limited to: webbing; an inelastic or elastic strap (depicted in FIG. 16 with a D-ring 72, and FIG. 46 with a carabiner 68). A releasable fastening connector can also include, but not be limited to a: pin, loop, clasp, buckle, snap-hook, G-hook, U-clip, button, zipper, screw, staple, a mechanical fastening apparatus, or a combination thereof.

FIG. 46 depicts the Device in an animal crate 74, with its lodging compartment's 54 opening's 36 edge area 52 comprising, from left to right: an attached 32 elastic or inelastic strap coupled with a squeeze or slide buckle 70; a fourth connector 44; and an attached 32 elastic or inelastic strap coupled with a carabiner 68. The crate's 74 door and top are not depicted, for clarity.

LAYER MEMBERS: An embodiment of the Device comprises at least one layer member. At least one layer member can concurrently and substantially swathe an animal inhabitant while at least one layer member remains releasably fastened substantially to a dog house's 10 or an animal crate's 74 respective entrances 34 (depicted in FIGS. 1, 31, 32, 34, 39, 40 41, and 46), whereby an animal inhabitant can have at-will accessibility to the Device's lodging compartment [54]. An upper layer member 46 may also be referred to as a top layer member 46, and a lower layer member 48 may also be referred to as a bottom layer member 48.

A preferred embodiment of the Device comprises at least an upper layer member 46 and a lower layer member 48 with at least one opening 36 to at least one lodging compartment 54, depicted in FIGS. 1, 2, 3, 4, 6, 7-8, 9, 14, 15, 16, 17, 18, 39, 40, 41, and 46. Said opening 36 of a said Device communicates with said upper layer member 46 and said lower layer member 48 which define said opening 36 to at least one said lodging compartment 54.

A preferred upper layer member 46 can be dimensioned and formed so that it can substantially lie adjoining a lower layer member 48 while said upper layer member 46 remains releasably fastened substantially to a dog house's 10 or an animal crate's 74 respective entrances 34, such as when an animal inhabitant is not present in the lodging compartment 54, depicted in FIGS. 1, 2, 3, 4, 5, 34, 40, and 46.

Figure 48:
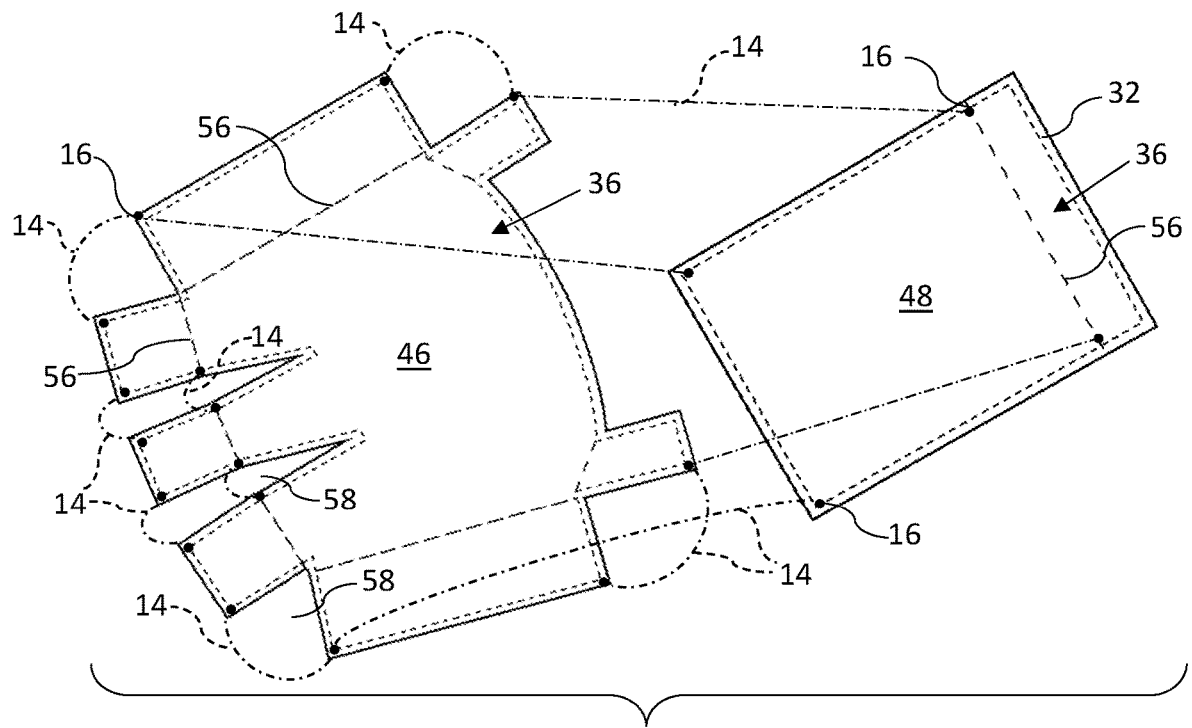
FIG. 48 depicts a top view of an assembly diagram for an upper layer member 46 and a lower layer member 48.

An upper layer member 46 can comprise darts 58 or pleats (pleats hereinafter referred to as darts 58) with the resulting gathers or troughs of said darts 58 facilitating a said upper layer member's 46 tendency to swathe an animal inhabitant (depicted in FIGS. 1, 2, 3, 4, 5, 6, 7, 9, 11, 12, 13, 31, 34, 39, 40, and 46). A lower layer member 48 can comprise darts 58 so that it can substantially conform to a lower section of a dog house 10 or animal crate 74, depicted in FIGS. 2, 3, 4, 6, 8, 9, 10, 31, 34 and 46. A preferred embodiment of the Device's layer members 46 and 48 can comprise radiused corners or curved proportions, such as in FIGS. 2, 10, 11, 12, 13, and 43. FIG. 48 depicts a lower layer member 48 comprising no darts 58.

Suggested patterns for layer member shapes are depicted in FIGS. 7, 8, 9, 10, 11, 12, 13, 43 and 48. The contours of any said layer member can be adjusted for the benefit of a specific animal inhabitant. Layer members can serve a specific function, and can include multiple layers, interior pockets, spaces, or ventilation apertures.

Layer-member fabric can comprise a sleeping-bag-like or comforter material, or any suitable material or construction. Said edge areas 52 of said layer members can be sewn 32, hemmed or bonded in a manner as is known in the art. A preferred lodging compartment's 54 surface can comprise a smooth material (i.e., a material comprising a lower frictional coefficient); a durable material, such as a ripstop nylon or polyester material; and an anti-static material.

Figure 18:
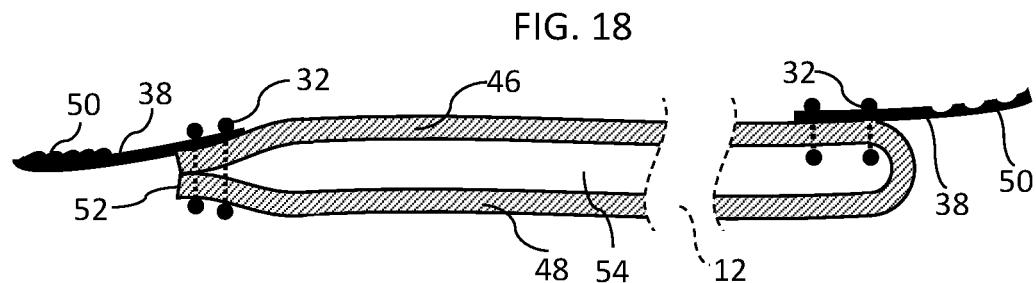
FIG. 18 depicts a front section view of layer members 46 and 48 comprising a single piece of material.

FIG. 5 depicts an embodiment of the Device comprising one layer member 46, functioning as an over-blanket. The depicted embodiment comprises first connectors 38 attached substantially to the sides and rear edge areas 52, and second connectors 40 attached substantially to the lodging compartment's 54 opening's 36 edge area 52. FIG. 18 depicts a front section-view of two layer members comprising a single piece of material (said section from FIG. 34), the "fold" depicted on the right side of the sleeping bag; also depicted in FIG. 18 are first connectors 38 with slip-inhibiting 50 textures (said section from FIG. 8).

Figure 2:
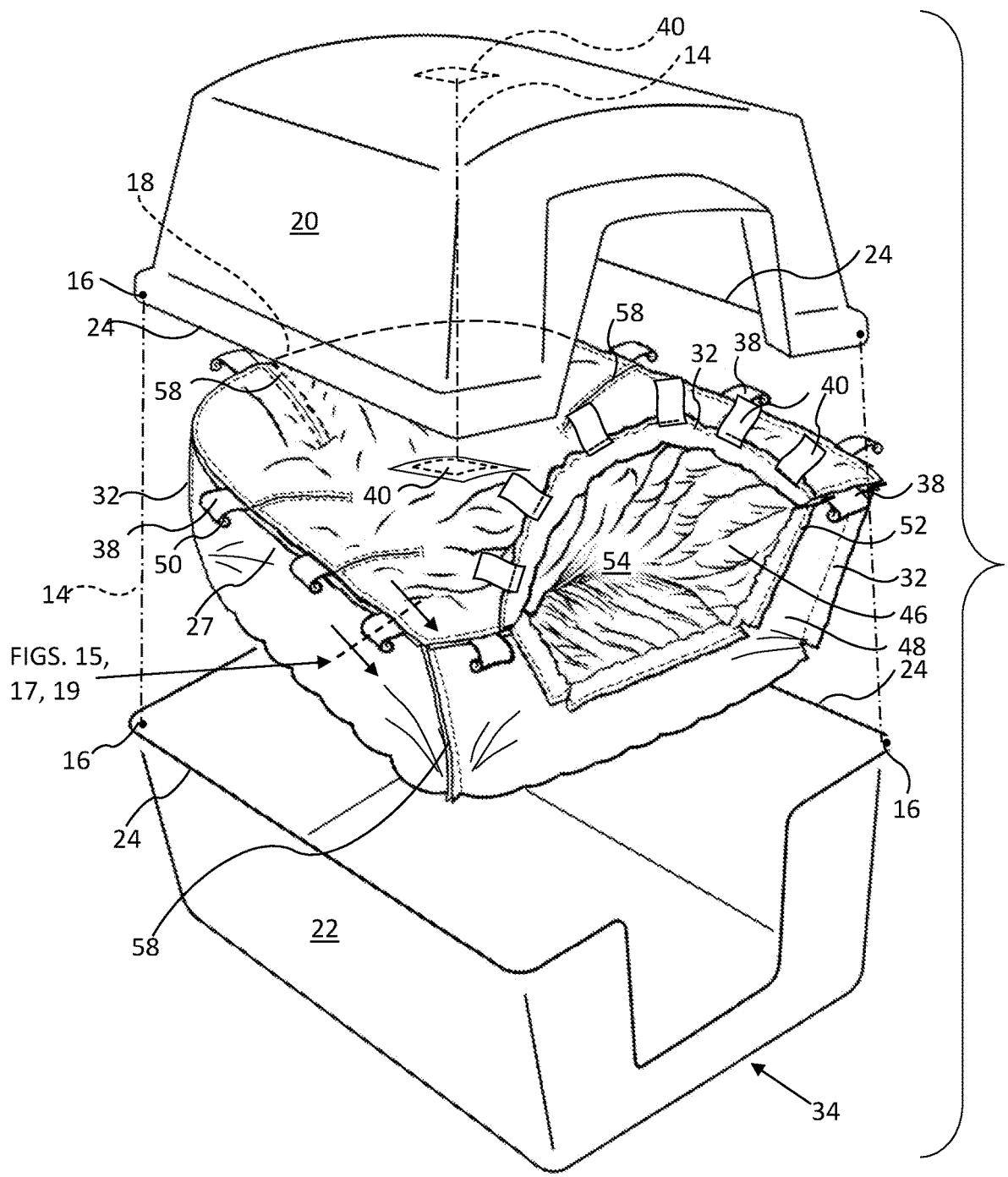
FIG. 2 depicts an exploded left-front perspective of an embodiment of a said Device in a sectional dog house 10.

As depicted in FIG. 2, at least one said connector from a variety of connectors, or at least one second connector 40, can be attached to an upper layer member 46, and its mating portion 40 can be correspondingly located (depicted by dashed line 14) and attached [to] a dog house's 10 top section's 20 or 26 interior ceiling (also depicted in FIG. 37) in order for said upper layer member 46 to be releasably fastened and disposed apart from a lower layer member 48, substantially preventing said upper layer member 46 from lying [upon]—or "draping" onto—said lower layer member 48, thereby allowing the lodging compartment's 54 volume to increase; to reduce the amount of insulating effect; and to allow an animal inhabitant unencumbered access to said lodging compartment 54. This separation of said layer members can be accomplished by using connectors 42, 44, 62, and 66, and other connectors.

A preferred releasable fastening of connectors to the Device, considering manufacturing economics, is by attaching first connectors 38 at the seams of upper 46 and lower 48 layer members, as depicted in FIGS. 2, 3, 4, 5, 8, 11, 12, 15, 17, 18, 19, 27, 28, 34, and 43.

Further, a said preferred releasable fastening of the Device to a dog house 10 can include releasable fastening first connectors 38 substantially between the engaging edges 24 of said dog house 10 (depicted in FIGS. 1, 27, 28, 38, 39, and 41), and sixth connectors 64 substantially to a said Device's opening 36 (depicted in FIGS. 1, 24, 25, 32, 39, 41, 46 and 49).

Figure 6:
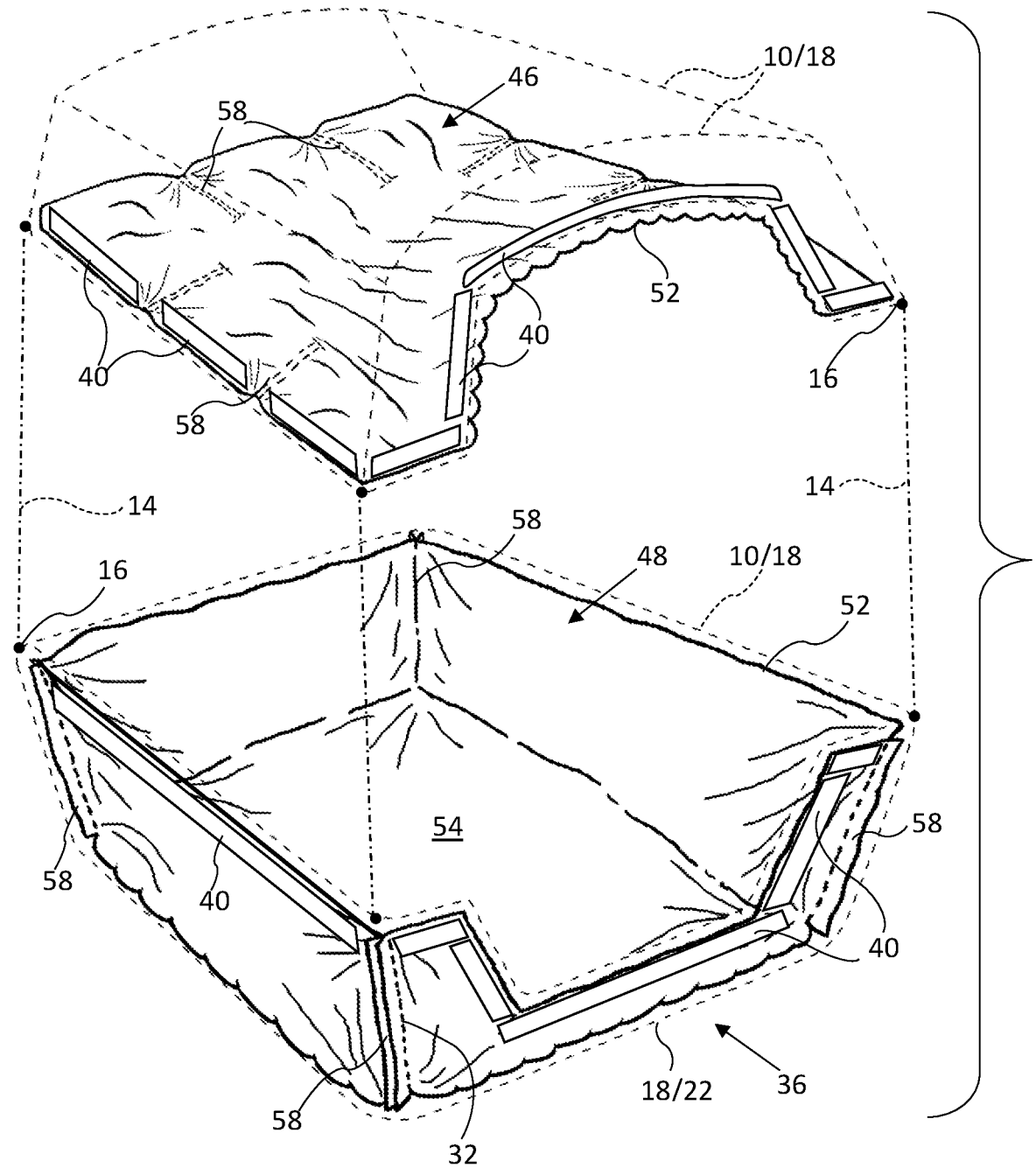
FIG. 6 depicts an exploded left-front perspective of an embodiment of Device between the sections of a sectional dog house 10, said dog house 10 depicted with dashed lines 18.
Figure 14:
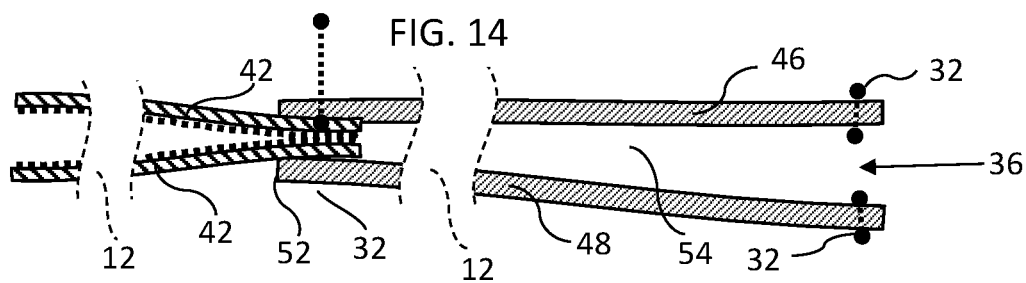
FIG. 14 depicts a left side-section view of two layer members 46 and 48.

At least one upper said layer member 46 and at least one lower said layer member 48 of said animal sleeping bag can be separately and releasably fastened to a respective upper said section 26 and a lower said section 28 of a said sectional dog house 10. FIG. 6 depicts an embodiment of the Device comprising two layer members 46 and 48 which can remain unattached from each other; said layer members are rather attached to the respective upper 26 and lower 28 sections of a dog house 10, and substantially to the dog house's 10 entrance's 34 upper and lower edge areas[[52]]. Each said layer member can comprise second connectors 40 with mating separable fastener material correspondingly located and securely attached on a said dog house 10. Alternatively, said layer members can comprise seventh connector 66 snaps.

FIG. 8 depicts an exemplary shape of a lower layer member 48 depicting five embodiments of connectors 38, 40, 44, 62, and 66 (not drawn to scale), attached in various locations on an animal sleeping bag. The upper half of FIG. 8 depicts first connectors 38 (comprising slip-inhibitive elements 50); seventh connectors 66 (snap halves) attached on the exterior of the lower layer member 48, as depicted by dashed lines 18; and fifth connectors 62. The lower-left-hand portion of the Figure depicts varying sizes of said second connectors 40 attached to the exterior bottom area, as depicted by dashed lines. The lower-right-hand portion of FIG. 8 depicts second connectors 40 attached substantially to the opening 36; attached to, and extending the length of, edge areas 52; and attached [to] the exterior bottom area. Sewing 32 (or, suitable attachment) locations are depicted. Alignment points 16 are connected by dash-dot assembly-path lines 14 to depict the sewing 32 of darts 58.

Figure 43:
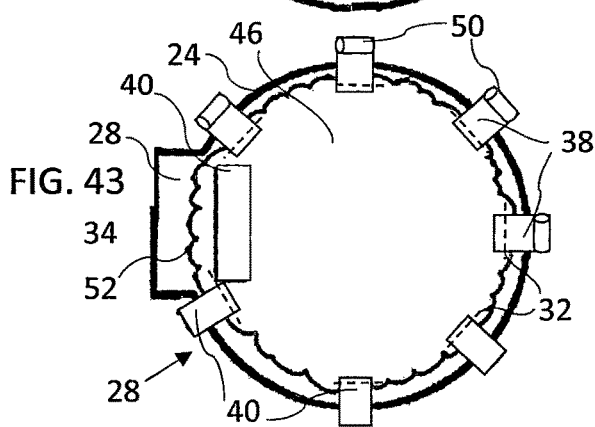
Figure 45:
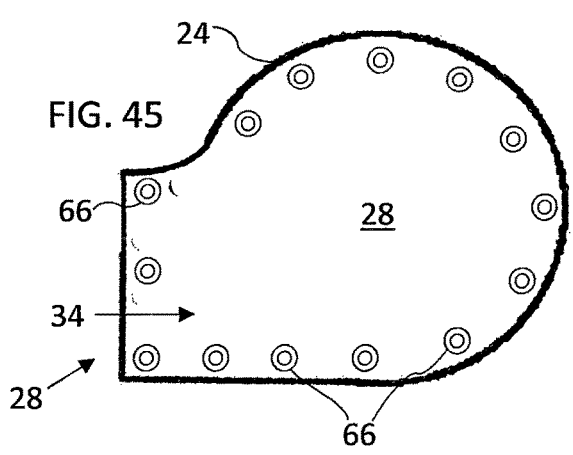

FIGS. 11, 12, and 43 depict layer member shapes which can be used in at least an igloo-style dog house 10. The exemplary pattern in FIG. 12 depicts a layer member comprising rounded proportions. Said layer member's shape depicted in FIG. 12 can be an example for both an upper layer member 46 and a lower layer member 48, or for a plurality of layer members.

FIG. 13 depicts an upper layer member 46 comprising a variety of connectors which can be integral to any layer member, and to which any suitable connector can be attached. FIG. 13 further depicts examples of four first connectors 38 comprising slip-inhibitive elements 50; three second connectors 40 comprising attached separable fastener material; two sewn-on 32 third connectors 42 comprising self-engaging separable fastener material; and two fourth connectors 44, including one slide buckle 70 (also depicted in FIG. 46), one D-ring 72 (also depicted in FIG. 16), two sewn-on 32 fourth connectors 44 (also depicted in FIG. 46), and three seventh connectors 66 (also depicted in FIG. 16). The Figure depicts dash-dot assembly-path lines 14 by which to sew 32 darts 58.

Figure 15:
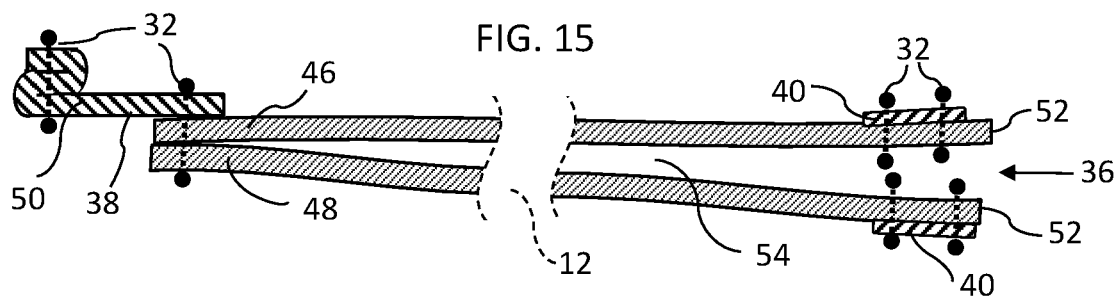
FIG. 15 depicts a left side-section view of embodiments of layer members 46 and 48.
Figure 19:
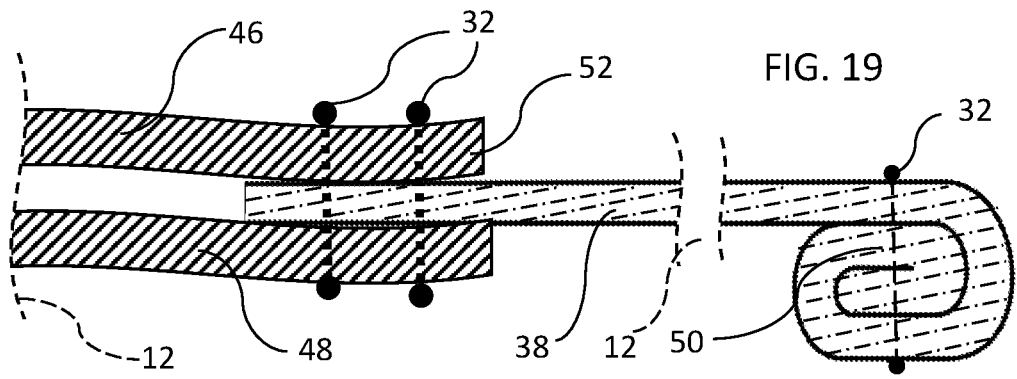
FIG. 19 depicts a side cross-section partial view of layer members 46 and 48 comprising an embodiment of a first connector 38.
Figure 20:
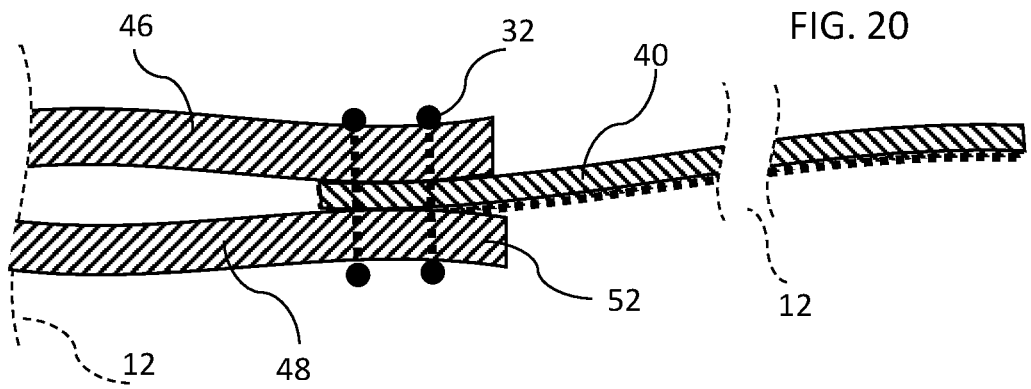
FIG. 20 depicts a side cross-section partial view of layer members 46 and 48 comprising an embodiment of a second connector 40.
Figure 21:
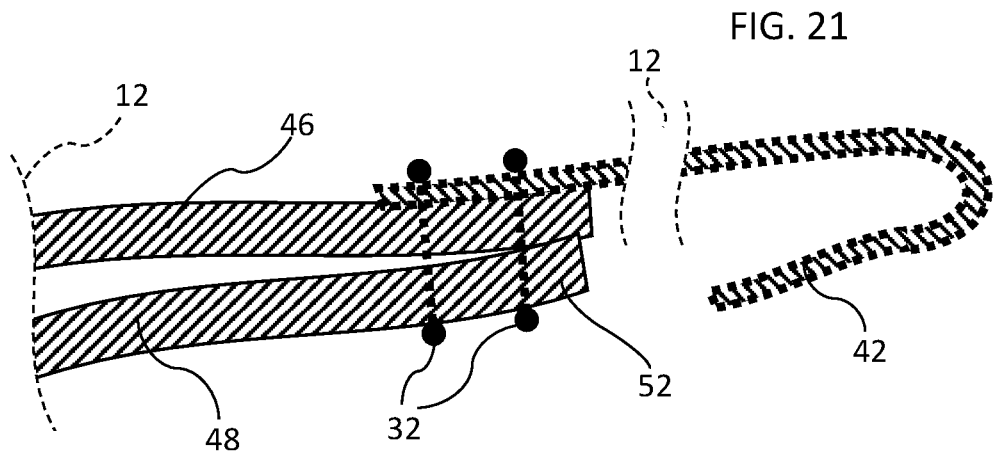
FIG. 21 depicts a side cross-section partial view of layer members 46 and 48 comprising an embodiment of a third connector 42.
Figure 35:
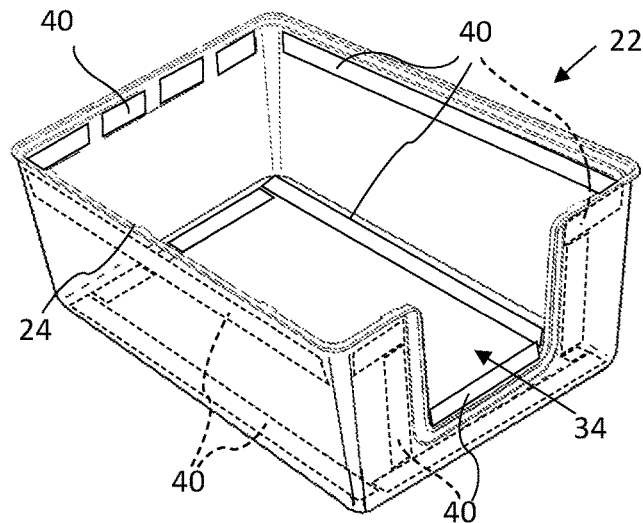
FIG. 35 depicts a left-front perspective view of a sectional dog house's 10 interior lower section 22.
Figure 36:
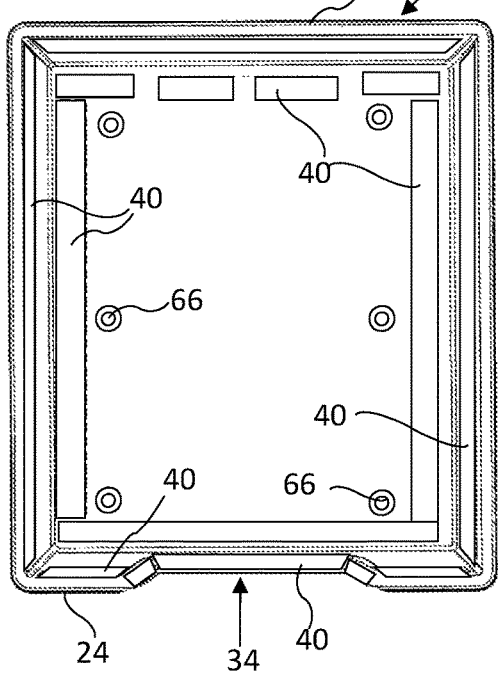
FIG. 36 depicts a top interior view of a sectional dog house's 10 lower section 22.
Figure 37:
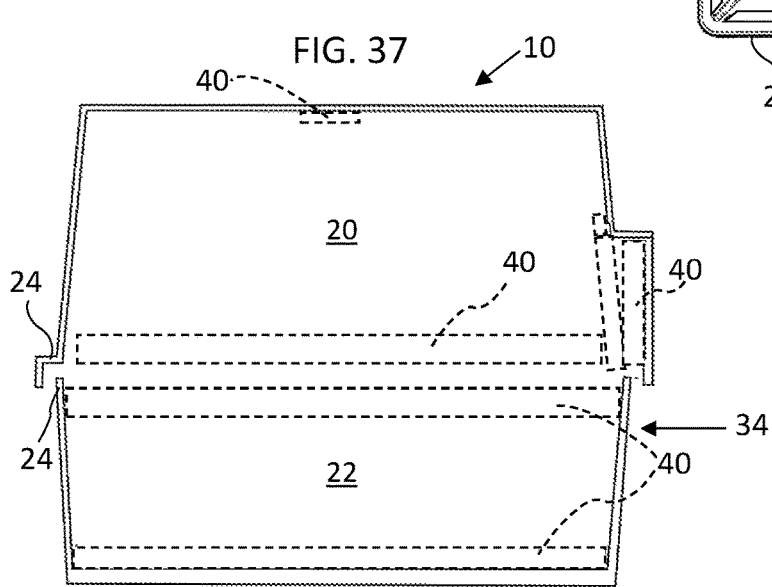
FIG. 37 depicts a left-side cross-section view of a sectional dog house 10.

FIG. 15 depicts a left side-section of an embodiment of two layer members depicted in FIG. 4; the left side of the depiction comprises a first connector 38 depicted in FIGS. 2 and 19; the right side of the depiction comprises second connectors 40, depicted in FIGS. 6, 8, and 29.

BENEFITS: Preferred embodiments of the Device are maintained in a stable configuration which can allow an animal to, at will, enter and exit a said lodging compartment 54; can promote an animal's ability to move within a said Device; can inhibit a said Device from becoming disarrayed; can reduce the attention an animal owner pays to a said Device; and can offer an animal owner reduced concern about an animal's comfort and protection from inclement weather.

An embodiment of the Device can be installed in a weather-resistant dog house 10 so that an animal can have additional protection from inclement weather. A said Device can be suitable for use in a variety of environments and for travel. A said Device, installed within an animal crate 74, can increase an animal's comfort in a variety of environments and situations, and can be useful in transporting an animal by calming an animal due to a said Device providing cushioning, increased insulation, and by reducing an animal's sensory input.

A preferred embodiment of a said layer member can substantially swathe, or drape, an animal inhabitant. Said swathing can reduce an animal's exposure to drafts, can increase efficiency in insulating an animal, can decrease an animal's exposure to light, can allow an animal to burrow, and can provide privacy to an animal's birthing and offspring.

Embodiments of the Device can comprise characteristics that can be adapted for use for a variety of animals. A said Device can be used for resting, sleeping, birthing, hibernating, isolation, to simulate a natural environment, and for an animal which prefers close contact with its surroundings. At least one said layer member can further comprise a filling or material from an animal inhabitant's natural habitat that is beneficial, familiar, or essential, to an animal inhabitant's wellbeing. Said layer members may comprise a form or texture appropriate for a given animal inhabitant.

A preferred embodiment of the Device will include connectors so that a said Device can be installed in a said dog house 10 without tools. Connectors can be adaptable to a non-sectional or home-built dog house 10 or animal crate 74.

The Device can provide further advantages. Because a said Device is supported by said dog house 10 or animal crate 74, there is no need for a proprietary frame, support members, or support bolsters. Material costs can be reduced since the components are readily available, and proprietary hardware may not be needed. Embodiments of a said Device can comprise light-weight, flexible and compressible materials which can reduce packaging size and shipping expenses, and can economize on warehouse storage and store display space.

An exemplary embodiment of the Device can be formed to compliment a design of a dog house 10 or animal crate 74. It can be configured to an animal enclosure [10/74] that may be vertical, set at an angle, curvilinear, or a combination thereof. A said Device can be cleanable and replaceable. A said Device can cooperate with a heating element or padding.

An animal can be introduced to the Device by its owner who can position said layer members in a flat configuration within an animal enclosure [10/74] so that an animal can lie on top of said layer members, thereby allowing an animal to become acclimated to a said Device. Further, a said dog house's 10 respective upper sections 20, 26 and 30 can be temporarily left off of a said dog house 10 to promote acclimation. An owner can coax an animal into the lodging compartment 54 by using treats or a toy, along with gradual exposure.

I claim:

1. A device comprising at least one portion of a flexible material; said flexible material shaped to form at least one upper layer member and at least one lower layer member; said upper and lower layer members attached around a major portion of edge areas of said upper and lower layer members; and wherein unattached edge areas of said upper and lower layer members define at least one opening between said layer members to define at least one lodging compartment, further said device comprising at least one of a variety of releasable fastening connectors, wherein at least a portion of said at least one connector is attached to at least one of said upper and lower layer member; further said at least one of a variety of connectors can releasably fasten a substantial portion of said edge area of said at least one opening to an edge area of an animal enclosure; and further wherein said at least one of a variety of connectors releasably fastens a substantial portion of at least one said upper and lower layer member within the interior of said animal enclosure.

2. The device of claim 1 wherein said upper and lower layer members can be attached around a major portion of said edge areas so as to create a sleeping bag for an animal.

3. The device of claim 1 wherein at least one of said upper and lower layer members being releasably fastened substantially within said animal enclosure, and can comprise a form which substantially swathes an animal inhabitant.

4. A said Device of claim 1 can comprise at least one said layer member which can function as an over-blanket.

5. At least two said upper and lower layer members of said Device of claim 1 can comprise dissimilar shapes.

6. At least one said upper and lower layer member of said Device of claim 1 can comprise material from a said animal inhabitant's natural habitat.

7. Said Device of claim 1 can cooperate with at least one of a heating element and padding.

8. The device of claim 1, wherein said at least one upper and lower layer members can be separately and releasably fastened to a respective upper section and lower section of a sectional dog house.

9. A said upper layer member of said Device of claim 1 can comprise at least one said connector which can releasably fasten a said upper layer member to the top of a said animal enclosure's said interior.

10. At least a said portion of said edge area of at least one said upper layer member, and at least a said portion of said edge area of at least one said lower layer member, of said Device of claim 1, can comprise at least one of a variety of said connectors by which corresponding said portions of said edge areas of said layer members can be releasably fastened together.

11. A said Device of claim 1 comprises at least one of a variety of said connectors which releasably fastens a substantial said portion of said Device's said opening's said edge area to a said animal enclosure's said entrance's said edge area; further, at least one of a variety of said connectors releasably fastens a substantial portion of said animal sleeping bag substantially within said interior of a said animal enclosure; whereby said Device can remain in a substantially stable configuration.

12. A said Device of claim 1 comprises at least one of a variety of said connectors which releasably fastens a substantial said portion of said opening's said edge area to a said animal enclosure's said entrance's said edge area; further, at least one of a variety of said connectors releasably fastens a substantial said portion of said animal sleeping bag substantially within said interior of a said animal enclosure; whereby a said animal inhabitant can have at-will accessibility to said Device's said lodging compartment.

13. At least one said connector of said Device of claim 1 can be integral to said Device.

14. At least one of a variety of said connectors of said Device of claim 1 can work in conjunction with a suitable connecting component; further, a said suitable connecting component can be correspondingly located and connected to a said animal enclosure.

15. Said Device of claim 1 can comprise at least one of a variety of said connectors which can be at least partially interposed between, substantially allow the joining of, and can deter at least a portion of a said connector from becoming disengaged from between, a said sectional dog house's said sections' said engaging edges.

16. At least one of a variety of said connectors of said Device of claim 1 can comprise at least one slip-inhibitive element, wherein at least a portion of a said slip-inhibitive element can be interposed between, substantially allow the joining of, and can deter at least a said portion of a said connector from becoming disengaged from between, a said sectional dog house's said sections' said engaging edges.

17. Said Device of claim 1 comprises at least one of a variety of said releasable fastening connectors which releasably fastens a substantial said portion of said animal sleeping bag and its said opening substantially to a said interior and to a said entrance, respectively, of a said animal enclosure; further, a said connector comprises at least one of the following features: at least one kind of a material; a said slip-inhibitive element; a said releasable fastening said portion; a mating said releasable fastening said portion; a said portion which attaches to said Device; a said portion which attaches to a said animal enclosure; a said portion of one said connector can releasably fasten to a said portion of another said connector; a portion of a said connector can be attached to a said Device, and a said portion of a said connector can releasably fasten to a said portion of itself; a said portion of a said connector can be attached to a said Device, a said portion of a said connector can be attached to a said animal enclosure, and a said releasable fastener is located between said attaching said portions; a said portion of one said connector which releasably fastens to a said mating portion of another said connector; and, a said connector which can be at least partially interposed between a said sectional dog house's said sections' said engaging edges.

18. Said Device of claim 1 can comprise at least one of a pocket, a space, and an aeration aperture.

19. Said Device of claim 1 comprises at least one of a variety of said connectors which can releasably fasten a substantial said portion of said opening's said edge area substantially to an animal crate's entrance's structure; further, at least one of a variety of said connectors can releasably fasten a substantial said portion of at least one said layer member within said animal crate; further, at least one said layer member can comprise a said form which substantially swathes a said animal inhabitant.

20. Said Device of claim 1 comprises a said animal sleeping bag and a variety of said connectors; further, said Device excludes the supporting elements of a said animal enclosure.

* * * * *